United States Patent
Abraham et al.

(10) Patent No.: US 10,306,438 B2
(45) Date of Patent: May 28, 2019

(54) OPERATING METHOD OF M2M TERMINAL IN WIRELESS COMMUNICATION SYSTEM

(71) Applicant: LG Electronics Inc., Seoul (KR)

(72) Inventors: Aby Kanneath Abraham, Karnataka (IN); Sunghoon Jung, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 15/517,460

(22) PCT Filed: Oct. 7, 2015

(86) PCT No.: PCT/KR2015/010595
§ 371 (c)(1),
(2) Date: Apr. 6, 2017

(87) PCT Pub. No.: WO2016/056839
PCT Pub. Date: Apr. 14, 2016

(65) Prior Publication Data
US 2017/0311113 A1    Oct. 26, 2017

Related U.S. Application Data

(60) Provisional application No. 62/061,105, filed on Oct. 7, 2014.

(51) Int. Cl.
*H04W 4/00* (2018.01)
*H04L 29/06* (2006.01)
(Continued)

(52) U.S. Cl.
CPC ........... *H04W 4/70* (2018.02); *H04L 63/1408* (2013.01); *H04W 4/90* (2018.02); *H04W 8/22* (2013.01);
(Continued)

(58) Field of Classification Search
CPC .................. H04W 4/005; H04W 76/007; H04W 24/08; H04W 4/22; H04W 8/22; H04L 63/1408
See application file for complete search history.

(56) References Cited

U.S. PATENT DOCUMENTS 9,125,026 B2 *  9/2015  Kim ................... H04W 52/0216
2007/0274241 A1 * 11/2007  Brothers ................ H04L 67/06
                                                               370/310
(Continued)

FOREIGN PATENT DOCUMENTS

WO    2012102487 A1    8/2012
WO    2012108647 A2    8/2012
(Continued)

OTHER PUBLICATIONS

WO/2012/173349 Method and Apparatus for Transmitting Data in P Ower Saving Mode in Wireless Communication System.*

*Primary Examiner* — Yemane Mesfin
*Assistant Examiner* — Henry Baron
(74) *Attorney, Agent, or Firm* — Dentons US LLP

(57) ABSTRACT

Disclosed is an operating method of an M2M terminal which operates in idle mode by confirming that there is no additional data transmission, transmitting to a base station a message for requesting to maintain context information during a predetermined time period which a timer indicates, even when changing to the idle mode, and receiving from the base station a message instructing to enter the idle mode.

12 Claims, 13 Drawing Sheets

(51) Int. Cl.
*H04W 24/08* (2009.01)
*H04W 76/00* (2018.01)
*H04W 8/22* (2009.01)
*H04W 4/70* (2018.01)
*H04W 4/90* (2018.01)
*H04W 76/50* (2018.01)
*H04W 76/27* (2018.01)
*H04W 76/25* (2018.01)

(52) U.S. Cl.
CPC .......... *H04W 24/08* (2013.01); *H04W 76/25* (2018.02); *H04W 76/27* (2018.02); *H04W 76/50* (2018.02)

(56) References Cited

U.S. PATENT DOCUMENTS

2015/0003391 A1* 1/2015 Chen ................ H04L 5/0092
370/329
2015/0195850 A1* 7/2015 Quan ................ H04L 1/18
370/329

FOREIGN PATENT DOCUMENTS

| WO | 2012173349 A2 | 12/2012 |
| WO | 2012173398 A2 | 12/2012 |
| WO | 2013115567 A1 | 8/2013 |

\* cited by examiner

FIG. 2
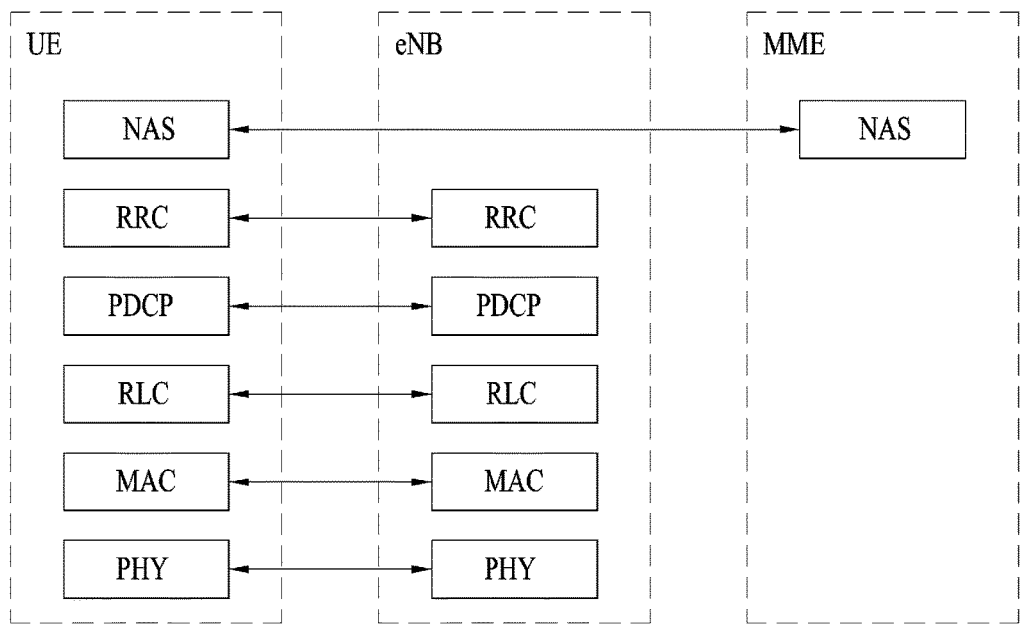
(a) control-plane protocol stack
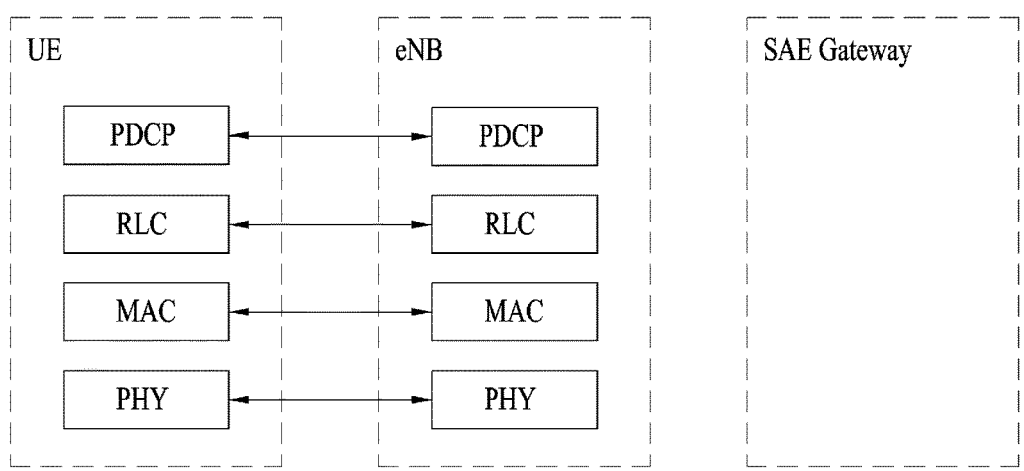
(b) user-plane protocol stack FIG. 9
(a)
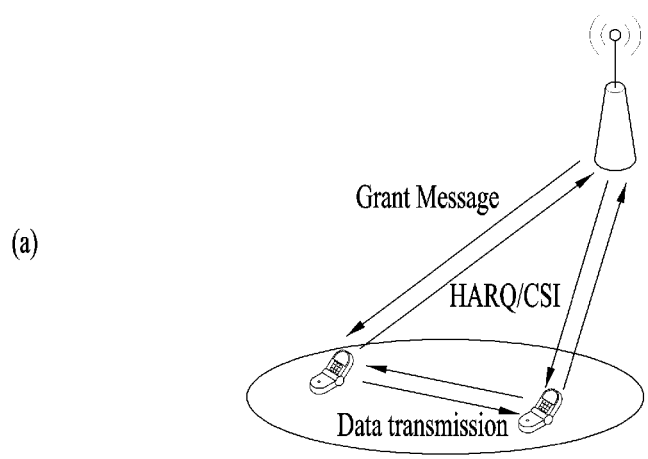
(b)
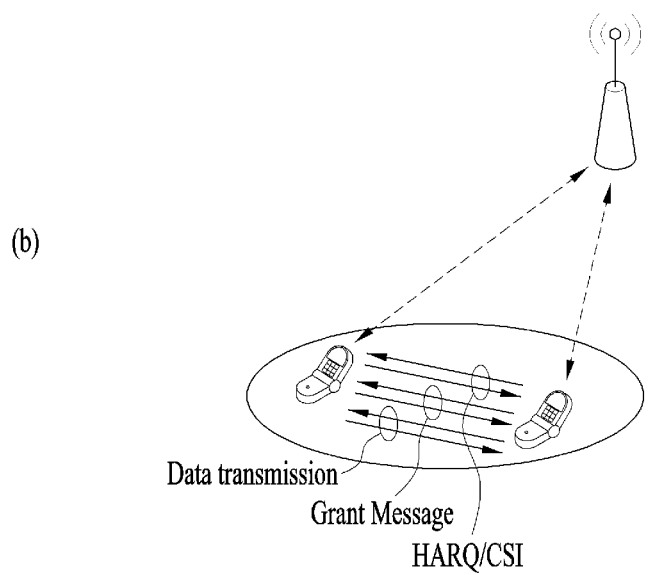

FIG. 10
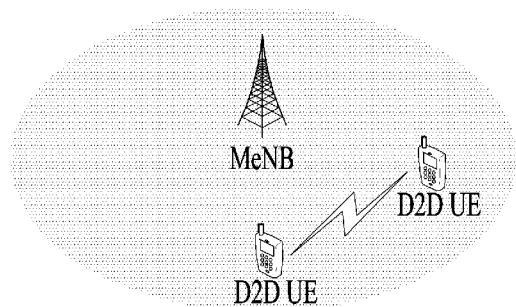
(a) case that D2D UEs performing D2D communication belong to coverage of network
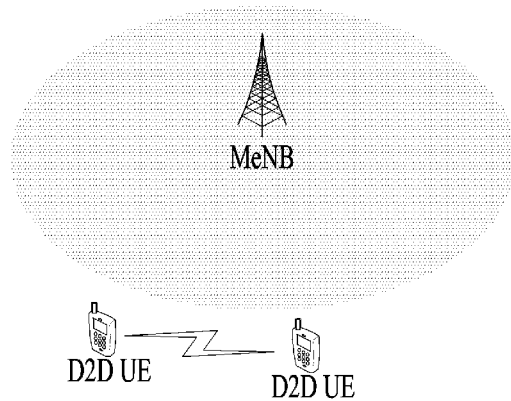
(b) case that D2D UEs performing D2D communication are out of coverage of network
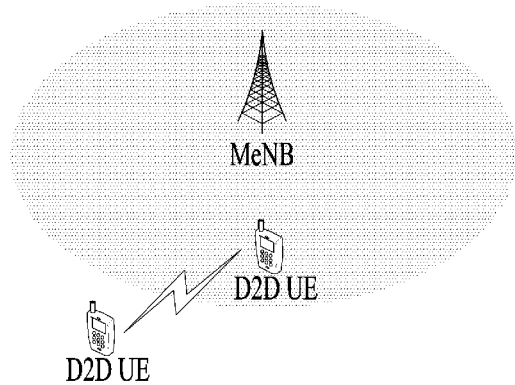
(c) case that part of D2D UEs performing D2D communication belong to coverage
of network and remaining D2D UEs are out of coverage of network

OPERATING METHOD OF M2M TERMINAL IN WIRELESS COMMUNICATION SYSTEM

This application is a 35 USC § 371 National Stage entry of International Application No. PCT/KR2015/010595 filed on Oct. 7, 2015, and claims priority to U.S. Provisional Application No. 62/061,105 filed Oct. 7, 2014, all of which are hereby incorporated by reference in their entireties as if fully set forth herein.

TECHNICAL FIELD

The present invention relates to an operation method of an M2M user equipment (UE) in a wireless communication system. More particularly, the present invention proposes an operation method of an M2M UE operating with enhanced communication efficiency by differently operating according to a process for communicating with a base station.

BACKGROUND ART

A 3rd generation partnership project long term evolution (3GPP LTE) (hereinafter, referred to as 'LTE') communication system which is an example of a wireless communication system to which the present invention can be applied will be described in brief.

FIG. 1 is a diagram illustrating a network structure of an Evolved Universal Mobile Telecommunications System (E-UMTS) which is an example of a wireless communication system. The E-UMTS is an evolved version of the conventional UMTS, and its basic standardization is in progress under the 3rd Generation Partnership Project (3GPP). The E-UMTS may be referred to as a Long Term Evolution (LTE) system or LTE-A (LTE-Advanced) system. Details of the technical specifications of the UMTS and E-UMTS may be understood with reference to Release 7 to Release 13 of "3rd Generation Partnership Project; Technical Specification Group Radio Access Network".

Referring to FIG. 1, the E-UMTS includes a User Equipment (UE), base stations (eNode B; eNB), and an Access Gateway (AG) which is located at an end of a network (E-UTRAN) and connected to an external network. The base stations may simultaneously transmit multiple data streams for a broadcast service, a multicast service and/or a unicast service.

One or more cells exist for one base station. One cell is set to one of bandwidths of 1.44, 3, 5, 10, 15 and 20 MHz to provide a downlink or uplink transport service to several user equipments. Different cells may be set to provide different bandwidths. Also, one base station controls data transmission and reception for a plurality of user equipments. The base station transmits downlink (DL) scheduling information of downlink data to the corresponding user equipment to notify the corresponding user equipment of time and frequency domains to which data will be transmitted and information related to encoding, data size, and hybrid automatic repeat and request (HARQ). Also, the base station transmits uplink (UL) scheduling information of uplink data to the corresponding user equipment to notify the corresponding user equipment of time and frequency domains that can be used by the corresponding user equipment, and information related to encoding, data size, and HARQ. An interface for transmitting user traffic or control traffic may be used between the base stations. A Core Network (CN) may include the AG and a network node or the like for user registration of the user equipment. The AG manages mobility of the user equipment on a Tracking Area (TA) basis, wherein one TA includes a plurality of cells.

Although the wireless communication technology developed based on WCDMA has been evolved into LTE-A, request and expectation of users and providers have continued to increase. Also, since another wireless access technology is being continuously developed, new evolution of the wireless communication technology will be required for competitiveness in the future. In this respect, reduction of cost per bit, increase of available service, use of adaptable frequency band, simple structure and open type interface, proper power consumption of the user equipment, etc. are required.

Disclosure of the Invention

Technical Tasks

The present invention is designed to solve the aforementioned general and technical problem. One object of the present invention is to enhance M2M communication efficiency between an M2M UE and a base station.

Another object of the present invention is to enhance power consumption of an M2M UE by controlling timing of switching to an idle mode or a DRX state of the M2M UE that performs M2M communication.

The technical problems solved by the present invention are not limited to the above technical problems and other technical problems which are not described herein will become apparent to those skilled in the art from the following description.

Technical Solution

To achieve these and other advantages and in accordance with the purpose of the present invention, as embodied and broadly described, according to one embodiment, an operation method of an M2M (Machine to Machine) UE (user equipment) includes the steps of checking that there is no data to be additionally transmitted after uplink data is transmitted, if it is checked that there is no data to be additionally transmitted, transmitting a first message to the base station to request to maintain context information although the M2M UE is switched to an idle mode, and receiving a second message for indicating the M2M UE to enter the idle mode from the base station in response to the first message. In this case, the first message includes a context keeping timer indicating a prescribed time period during which the context information is to be maintained.

A value of the context keeping timer can be determined in consideration of a time period between a timing at which the first message is transmitted and a timing at which a new uplink transmission is to be performed.

If the base station is able to maintain the context information, the second message can include information on a time period capable of maintaining the context information maintained by the base station.

If the base station is unable to maintain the context information, the second message can include information indicating that the base station is unable to maintain the context information.

According to the received second message, the operation method further comprises the step of switching to the idle mode while maintaining context information occupied by the M2M UE.

If a new uplink transmission is performed for the prescribed time period, the operation method further comprises the step of transmitting an SR (scheduling request) to the base station.

If a new uplink transmission is performed for the prescribed time period, the operation method further comprises the step of performing an RRC (Radio Resource Control) connection reestablishment procedure with the base station.

The context information can include at least one selected from the group consisting of information on a C-RNTI (Cell-Radio Network Temporary Identifier) of the M2M UE, a parameter for E-RAB (E-UTRAN Radio Access Bearer) of the M2M UE, information on a QCI (QoS Class Identifier), information on ARP (Allocation and Retention Priority), information on UE-AMBR (User Equipment-Aggregated Maximum Bit Rate), and information on S1 S-GW TEID (S1 Serving GateWay Tunnel Endpoint Identifier).

If the prescribed time period is expired, the context information can be discarded.

To further achieve these and other advantages and in accordance with the purpose of the present invention, according to a different embodiment, an M2M UE performing M2M communication with a base station includes a transmitting unit, a receiving unit, and a processor configured to operate in a manner of being connected with the transmitting unit and the receiving unit, the processor configured to check that there is no data to be additionally transmitted after uplink data is transmitted, the processor, if it is checked that there is no data to be additionally transmitted, configured to control the transmitting unit to transmit a first message to the base station to request to maintain context information although the M2M UE is switched to an idle mode, the processor configured to receive a second message for indicating the M2M UE to enter the idle mode from the base station in response to the first message. In this case, the first message can include a context keeping timer indicating a prescribed time period during which the context information is to be maintained.

To further achieve these and other advantages and in accordance with the purpose of the present invention, according to a further different embodiment, an operation method of a base station performing M2M communication with an M2M UE, includes the steps of, according as the M2M UE checked that there is no data to be additionally transmitted after uplink data is transmitted, receiving a first message for requesting to maintain context information from the M2M UE although the M2M UE is switched to an idle mode, transmitting a second message for indicating the M2M UE to enter the idle mode to the M2M UE in response to the first message, and transmitting a second message for indicating the M2M UE to enter the idle mode to the M2M UE in response to the first message. In this case, the first message can include a context keeping timer indicating a prescribed time period during which the context information is to be maintained.

To further achieve these and other advantages and in accordance with the purpose of the present invention, according to a further different embodiment, a base station performing M2M communication with an M2M UE includes a transmitting unit, a receiving unit, and a processor configured to operate in a manner of being connected with the transmitting unit and the receiving unit, the processor, according as the M2M UE checked that there is no data to be additionally transmitted after uplink data is transmitted, configured to control the receiving unit to receive a first message for requesting to maintain context information from the M2M UE although the M2M UE is switched to an idle mode, the processor configured to control the transmitting unit to transmit a second message for indicating the M2M UE to enter the idle mode in response to the first message. In this case, the first message can include a context keeping timer indicating a prescribed time period during which the context information is to be maintained.

Advantageous Effects

As is apparent from the above description, the embodiments of the present invention have the following effects.

First of all, it is able to enhance M2M communication efficiency between an M2M UE and a base station.

Secondly, since operation time of an M2M UE operating in an idle mode or a DRX state is increased, it is able to reduce battery consumption.

Thirdly, it is able to minimize signaling overhead required for an operation process of an M2M UE.

The effects of the present invention are not limited to the above-described effects and other effects which are not described herein may be derived by those skilled in the art from the following description of the embodiments of the present invention. That is, effects which are not intended by the present invention may be derived by those skilled in the art from the embodiments of the present invention.

DESCRIPTION OF DRAWINGS

The accompanying drawings, which are included to provide a further understanding of the invention, illustrate embodiments of the invention and together with the description serve to explain the principle of the invention. The technical features of the present invention are not limited to specific drawings and the features shown in the drawings are combined to construct a new embodiment. Reference numerals of the drawings mean structural elements.

FIG. 2 illustrates structures of control and user planes of a radio interface protocol between a user equipment and E-UTRAN based on 3GPP radio access network standard.

FIG. 9 is a reference diagram to describe D2D (Device-to-Device) communication.

FIG. 10 is a reference diagram to describe scenarios for performing D2D communication.

BEST MODE

Mode for Invention

Figure 1:
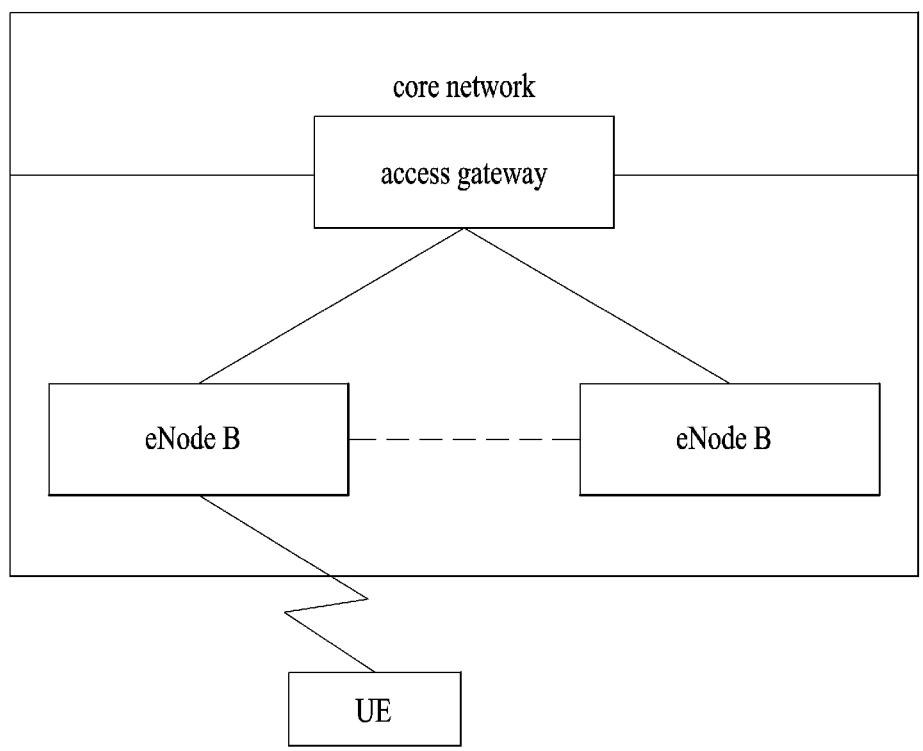
FIG. 1 is a schematic diagram of an E-UMTS network structure as one example of a wireless communication system.

Although the terms used in the present invention are selected from generally known and used terms, terms used herein may be varied depending on operator's intention or customs in the art, appearance of new technology, or the like. In addition, some of the terms mentioned in the description of the present invention have been selected by the applicant at his or her discretion, the detailed meanings of which are described in relevant parts of the description herein. Furthermore, it is required that the present invention is understood, not simply by the actual terms used but by the meanings of each term lying within.

The following embodiments are proposed by combining constituent components and characteristics of the present invention according to a predetermined format. The individual constituent components or characteristics should be considered optional factors on the condition that there is no additional remark. If required, the individual constituent components or characteristics may not be combined with other components or characteristics. In addition, some constituent components and/or characteristics may be combined to implement the embodiments of the present invention. The order of operations to be disclosed in the embodiments of the present invention may be changed. Some components or characteristics of any embodiment may also be included in other embodiments, or may be replaced with those of the other embodiments as necessary.

In describing the present invention, if it is determined that the detailed description of a related known function or construction renders the scope of the present invention unnecessarily ambiguous, the detailed description thereof will be omitted.

In the entire specification, when a certain portion "comprises or includes" a certain component, this indicates that the other components are not excluded and may be further included unless specially described otherwise. The terms "unit", "-or/er" and "module" described in the specification indicate a unit for processing at least one function or operation, which may be implemented by hardware, software or a combination thereof. The words "a or an", "one", "the" and words related thereto may be used to include both a singular expression and a plural expression unless the context describing the present invention (particularly, the context of the following claims) clearly indicates otherwise.

In this document, the embodiments of the present invention have been described centering on a data transmission and reception relationship between a mobile station and a base station. The base station may mean a terminal node of a network which directly performs communication with a mobile station. In this document, a specific operation described as performed by the base station may be performed by an upper node of the base station.

Namely, it is apparent that, in a network comprised of a plurality of network nodes including a base station, various operations performed for communication with a mobile station may be performed by the base station, or network nodes other than the base station. The term base station may be replaced with the terms fixed station, Node B, eNode B (eNB), advanced base station (ABS), access point, etc.

The term mobile station (MS) may be replaced with user equipment (UE), subscriber station (SS), mobile subscriber station (MSS), mobile terminal, advanced mobile station (AMS), terminal, etc.

A transmitter refers to a fixed and/or mobile node for transmitting a data or voice service and a receiver refers to a fixed and/or mobile node for receiving a data or voice service. Accordingly, in uplink, a mobile station becomes a transmitter and a base station becomes a receiver. Similarly, in downlink transmission, a mobile station becomes a receiver and a base station becomes a transmitter.

Communication of a device with a "cell" may mean that the device transmit and receive a signal to and from a base station of the cell. That is, although a device substantially transmits and receives a signal to a specific base station, for convenience of description, an expression "transmission and reception of a signal to and from a cell formed by the specific base station" may be used. Similarly, the term "macro cell" and/or "small cell" may mean not only specific coverage but also a "macro base station supporting the macro cell" and/or a "small cell base station supporting the small cell".

The embodiments of the present invention can be supported by the standard documents disclosed in any one of wireless access systems, such as an IEEE 802.xx system, a 3rd Generation Partnership Project (3GPP) system, a 3GPP Long Term Evolution (LTE) system, and a 3GPP2 system. That is, the steps or portions, which are not described in order to make the technical spirit of the present invention clear, may be supported by the above documents.

In addition, all the terms disclosed in the present document may be described by the above standard documents. In particular, the embodiments of the present invention may be supported by at least one of P802.16-2004, P802.16e-2005, P802.16.1, P802.16p and P802.16.1b documents, which are the standard documents of the IEEE 802.16 system.

Hereinafter, the preferred embodiments of the present invention will be described with reference to the accompanying drawings. It is to be understood that the detailed description which will be disclosed along with the accompanying drawings is intended to describe the exemplary embodiments of the present invention, and is not intended to describe a unique embodiment which the present invention can be carried out.

It should be noted that specific terms disclosed in the present invention are proposed for convenience of description and better understanding of the present invention, and the use of these specific terms may be changed to another format within the technical scope or spirit of the present invention.

1. LTE/LTE-A System Overview

FIG. 2 is a diagram illustrating structures of a control plane and a user plane of a radio interface protocol between a user equipment and E-UTRAN based on the 3GPP radio access network standard. The control plane means a passageway where control messages are transmitted, wherein the control messages are used by the user equipment and the network to manage call. The user plane means a passageway where data generated in an application layer, for example, voice data or Internet packet data are transmitted.

A physical layer as the first layer provides an information transfer service to an upper layer using a physical channel. The physical layer is connected to a medium access control (MAC) layer via a transport channel, wherein the medium access control layer is located above the physical layer. Data are transferred between the medium access control layer and the physical layer via the transport channel Data are transferred between one physical layer of a transmitting side and the other physical layer of a receiving side via the physical channel. The physical channel uses time and frequency as radio resources. In more detail, the physical channel is modulated in accordance with an orthogonal frequency division multiple access (OFDMA) scheme in a downlink, and is modulated in accordance with a single carrier frequency division multiple access (SC-FDMA) scheme in an uplink.

A medium access control (MAC) layer of the second layer provides a service to a radio link control (RLC) layer above the MAC layer via a logical channel. The RLC layer of the second layer supports reliable data transmission. The RLC layer may be implemented as a functional block inside the MAC layer. In order to effectively transmit data using IP packets such as IPv4 or IPv6 within a radio interface having a narrow bandwidth, a packet data convergence protocol (PDCP) layer of the second layer performs header compression to reduce the size of unnecessary control information.

A radio resource control (RRC) layer located on the lowest part of the third layer is defined in the control plane only. The RRC layer is associated with configuration, reconfiguration and release of radio bearers ('RBs') to be in charge of controlling the logical, transport and physical channels. In this case, the RB means a service provided by the second layer for the data transfer between the user equipment and the network. To this end, the RRC layers of the user equipment and the network exchange RRC message with each other. If the RRC layer of the user equipment is RRC connected with the RRC layer of the network, the user equipment is in an RRC connected mode. If not so, the user equipment is in an RRC idle mode. A non-access stratum (NAS) layer located above the RRC layer performs functions such as session management and mobility management.

One cell constituting a base station eNB is set to one of bandwidths of 1.4, 3.5, 5, 10, 15, and 20 MHz and provides a downlink or uplink transmission service to several user equipments. At this time, different cells may be set to provide different bandwidths.

As downlink transport channels carrying data from the network to the user equipment, there are provided a broadcast channel (BCH) carrying system information, a paging channel (PCH) carrying paging message, and a downlink shared channel (SCH) carrying user traffic or control messages. Traffic or control messages of a downlink multicast or broadcast service may be transmitted via the downlink SCH or an additional downlink multicast channel (MCH). Meanwhile, as uplink transport channels carrying data from the user equipment to the network, there are provided a random access channel (RACH) carrying an initial control message and an uplink shared channel (UL-SCH) carrying user traffic or control message. As logical channels located above the transport channels and mapped with the transport channels, there are provided a broadcast control channel (BCCH), a paging control channel (PCCH), a common control channel (CCCH), a multicast control channel (MCCH), and a multicast traffic channel (MTCH).

Figure 3:
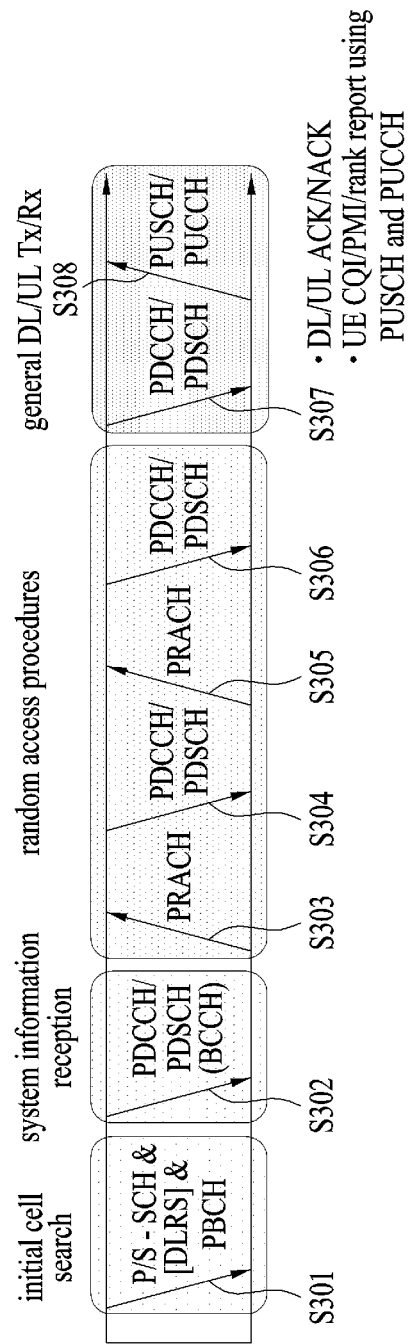
FIG. 3 illustrates physical channels used for a 3GPP LTE system and a general signal transmission method using the same.

FIG. 3 is a diagram illustrating physical channels used in a 3GPP LTE/LTE-A system and a general method for transmitting a signal using the physical channels.

The user equipment performs initial cell search such as synchronizing with the base station when it newly enters a cell or the power is turned on at step S301. To this end, the user equipment synchronizes with the base station by receiving a primary synchronization channel (P-SCH) and a secondary synchronization channel (S-SCH) from the base station, and acquires information such as cell ID, etc. Afterwards, the user equipment may acquire broadcast information within the cell by receiving a physical broadcast channel (PBCH) from the base station. Meanwhile, the user equipment may identify a downlink channel status by receiving a downlink reference signal (DL RS) at the initial cell search step.

The user equipment which has finished the initial cell search may acquire more detailed system information by receiving a physical downlink shared channel (PDSCH) in accordance with a physical downlink control channel (PDCCH) and information carried in the PDCCH at step S302.

Afterwards, the user equipment may perform a random access procedure (RACH) such as steps S303 to S306 to complete access to the base station. To this end, the user equipment may transmit a preamble through a physical random access channel (PRACH) (S303), and may receive a response message to the preamble through the PDCCH and the PDSCH corresponding to the PDCCH (S304). In case of a contention based RACH, the user equipment may perform a contention resolution procedure such as transmission (S305) of additional physical random access channel and reception (S306) of the physical downlink control channel and the physical downlink shared channel corresponding to the physical downlink control channel.

The user equipment which has performed the aforementioned steps may receive the physical downlink control channel (PDCCH)/physical downlink shared channel (PDSCH) (S307) and transmit a physical uplink shared channel (PUSCH) and a physical uplink control channel (PUCCH) (S308), as a general procedure of transmitting uplink/downlink signals. Control information transmitted from the user equipment to the base station will be referred to as uplink control information (UCI). The UCI includes HARQ ACK/NACK (Hybrid Automatic Repeat and reQuest Acknowledgement/Negative-ACK), SR (Scheduling Request), CSI (Channel State Information), etc. In this specification, the HARQ ACK/NACK will be referred to as HARQ-ACK or ACK/NACK (A/N). The HARQ-ACK includes at least one of positive ACK (simply, referred to as ACK), negative ACK (NACK), DTX and NACK/DTX. The CSI includes CQI (Channel Quality Indicator), PMI (Precoding Matrix Indicator), RI (Rank Indication), etc. Although the UCI is generally transmitted through the PUCCH, it may be transmitted through the PUSCH if control information and traffic data should be transmitted at the same time. Also, the user equipment may non-periodically transmit the UCI through the PUSCH in accordance with request/command of the network.

Figure 4:
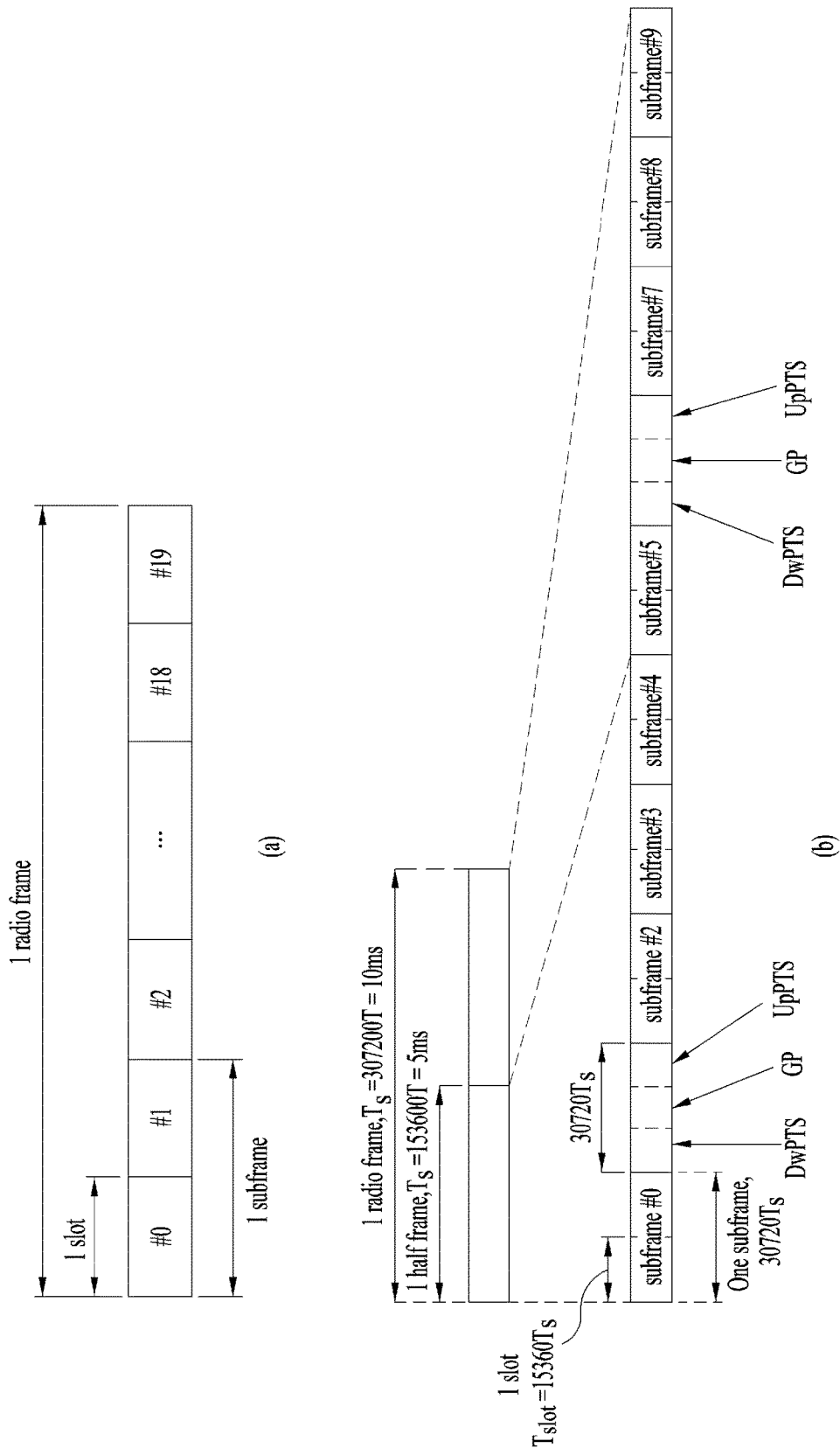
FIG. 4 illustrates a structure of a radio frame used in an LTE/LTE-A system.

FIG. 4 is a diagram illustrating a structure of a radio frame used in an LTE/LTE-A system.

Referring to FIG. 4, in a cellular OFDM radio packet communication system, uplink/downlink data packet transmission is performed in a unit of subframe, wherein one subframe is defined by a given time interval that includes a plurality of OFDM symbols. The 3GPP LTE standard supports a type 1 radio frame structure applicable to frequency division duplex (FDD) and a type 2 radio frame structure applicable to time division duplex (TDD).

FIG. 4(a) is a diagram illustrating a structure of a type 1 radio frame. The downlink radio frame includes 10 subframes, each of which includes two slots in a time domain. A time required to transmit one subframe will be referred to as a transmission time interval (TTI). For example, one subframe may have a length of 1 ms, and one slot may have a length of 0.5 ms. One slot includes a plurality of OFDM symbols in a time domain and a plurality of resource blocks (RB) in a frequency domain. Since the 3GPP LTE system uses OFDM in a downlink, OFDM symbols represent one symbol interval. The OFDM symbol may be referred to as SC-FDMA symbol or symbol interval. The resource block (RB) as a resource allocation unit may include a plurality of continuous subcarriers in one slot.

The number of OFDM symbols included in one slot may be varied depending on configuration of a cyclic prefix (CP). Examples of the CP include an extended CP and a normal CP. For example, if the OFDM symbols are configured by the normal CP, the number of OFDM symbols included in one slot may be 7. If the OFDM symbols are configured by the extended CP, since the length of one OFDM symbol is increased, the number of OFDM symbols included in one slot is smaller than that of OFDM symbols in case of the normal CP. For example, in case of the extended CP, the number of OFDM symbols included in one slot may be 6. If a channel state is unstable like the case where the user equipment moves at high speed, the extended CP may be used to reduce inter-symbol interference.

If the normal CP is used, since one slot includes seven OFDM symbols, one subframe includes 14 OFDM symbols. At this time, first maximum three OFDM symbols of each subframe may be allocated to a physical downlink control channel (PDCCH), and the other OFDM symbols may be allocated to a physical downlink shared channel (PDSCH).

FIG. 4(b) is a diagram illustrating a structure of a type 2 radio frame. The type 2 radio frame includes two half frames, each of which includes four general subframes, which include two slots, and a special subframe which includes a downlink pilot time slot (DwPTS), a guard period (GP), and an uplink pilot time slot (UpPTS).

In the special subframe, the DwPTS is used for initial cell search, synchronization or channel estimation at the user equipment. The UpPTS is used for channel estimation at the base station and uplink transmission synchronization of the user equipment. In other words, the DwPTS is used for downlink transmission, whereas the UpPTS is used for uplink transmission. Especially, the UpPTS is used for PRACH preamble or SRS transmission. Also, the guard period is to remove interference occurring in the uplink due to multipath delay of downlink signals between the uplink and the downlink.

Configuration of the special subframe is defined in the current 3GPP standard document as illustrated in Table 1 below. Table 1 illustrates the DwPTS and the UpPTS in case of $T_s=1/(15000 \times 2048)$, and the other region is configured for the guard period.

In the meantime, the structure of the type 2 radio frame, that is, uplink/downlink configuration (UL/DL configuration) in the TDD system is as illustrated in Table 2 below.

TABLE 2

| Uplink-downlink config-uration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In the above Table 2, D means the downlink subframe, U means the uplink subframe, and S means the special subframe. Also, Table 2 also illustrates a downlink-uplink switching period in the uplink/downlink subframe configuration of each system.

The structure of the aforementioned radio frame is only exemplary, and various modifications may be made in the number of subframes included in the radio frame, the number of slots included in the subframe, or the number of symbols included in the slot.

Figure 5:
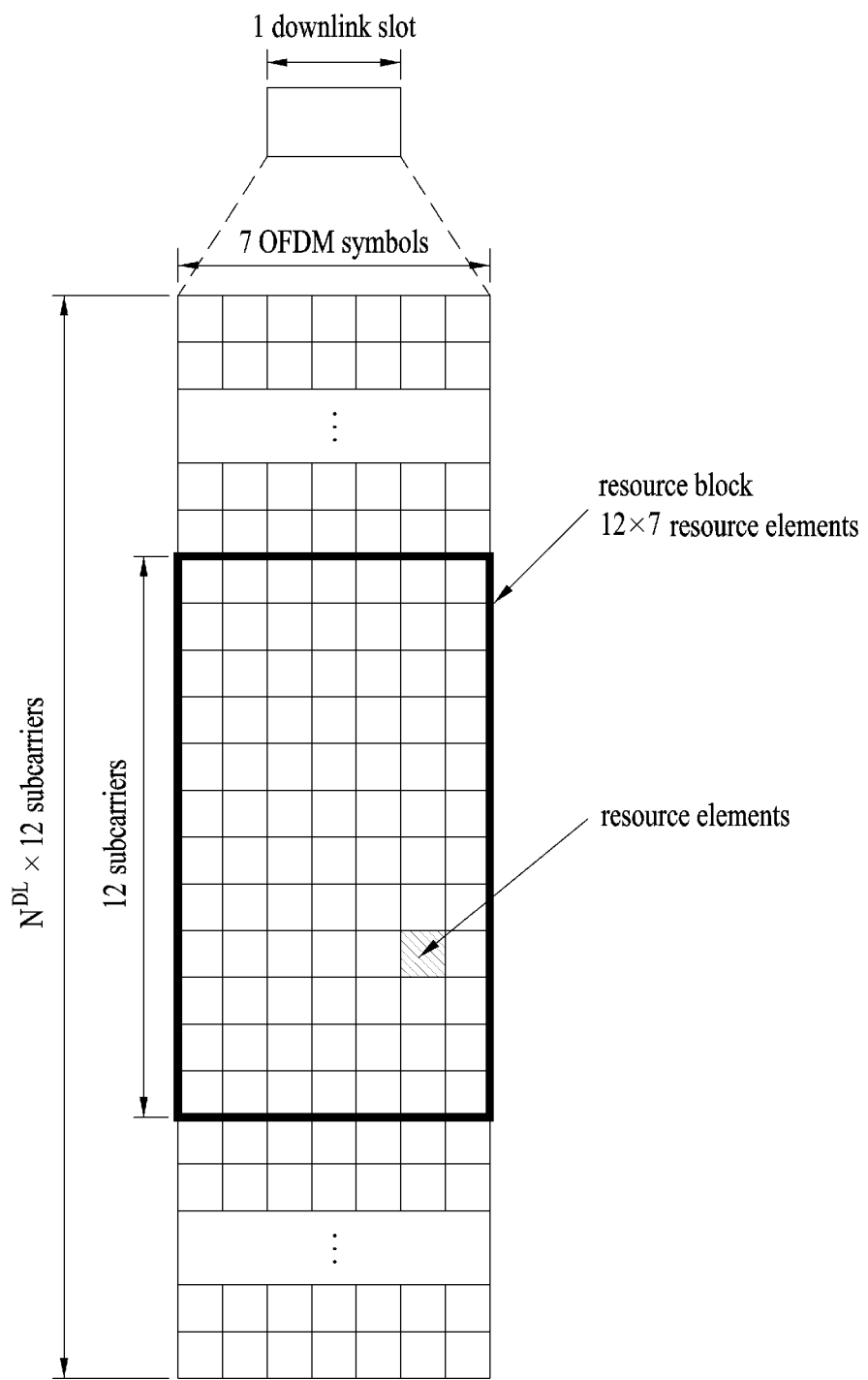
FIG. 5 illustrates a resource grid for a downlink slot.

FIG. 5 illustrates a resource grid for a DL slot.

Referring to FIG. 5, a DL slot includes $N_{symb}^{DL}$ OFDM symbols in the time domain and $N_{RB}^{DL}$ resource blocks (RBs) in the frequency domain. Since each RB includes $N_{sc}^{RB}$ subcarriers, a DL slot includes $N_{RB}^{DL} \times N_{sc}^{RB}$ subcarriers in the frequency domain. While FIG. 5 illustrates that a DL slot includes 7 OFDM symbols and an RB includes 12 subcarriers, embodiments of the present invention are not limited thereto. For example, the number of OFDM symbols included in a DL slot may be changed according to the length of a cyclic prefix (CP).

Each element in the resource grid is referred to as a resource element (RE). Each RE is indicated by an OFDM symbol index and a subcarrier index. One RB consists of $N_{symb}^{DL} \times N_{sc}^{RB}$ REs. The number of RBs ($N_{RB}^{DL}$) included in a DL slot depends on a DL transmission bandwidth set in a cell.

TABLE 1

| | | Normal cyclic prefix in downlink | | | Extended cyclic prefix in downlink | |
|---|---|---|---|---|---|---|
| | | | UpPTS | | | UpPTS |
| Special subframe configuration | DwPTS | Normal cyclic prefix in uplink | Extended cyclic prefix in uplink | DwPTS | Normal cyclic prefix in uplink | Extended cyclic prefix in uplink |
| 0 | 6592 · $T_s$ | 2192 · $T_s$ | 2560 · $T_s$ | 7680 · $T_s$ | 2192 · $T_s$ | 2560 · $T_s$ |
| 1 | 19760 · $T_s$ | | | 20480 · $T_s$ | | |
| 2 | 21952 · $T_s$ | | | 23040 · $T_s$ | | |
| 3 | 24144 · $T_s$ | | | 25600 · $T_s$ | | |
| 4 | 26336 · $T_s$ | | | 7680 · $T_s$ | 4384 · $T_s$ | 5120 · $T_s$ |
| 5 | 6592 · $T_s$ | 4384 · $T_s$ | 5120 · $T_s$ | 20480 · $T_s$ | | |
| 6 | 19760 · $T_s$ | | | 23040 · $T_s$ | | |
| 7 | 21952 · $T_s$ | | | 12800 · $T_s$ | | |
| 8 | 24144 · $T_s$ | | | — | — | — |
| 9 | 13168 · $T_s$ | | | — | — | — |

Figure 6:
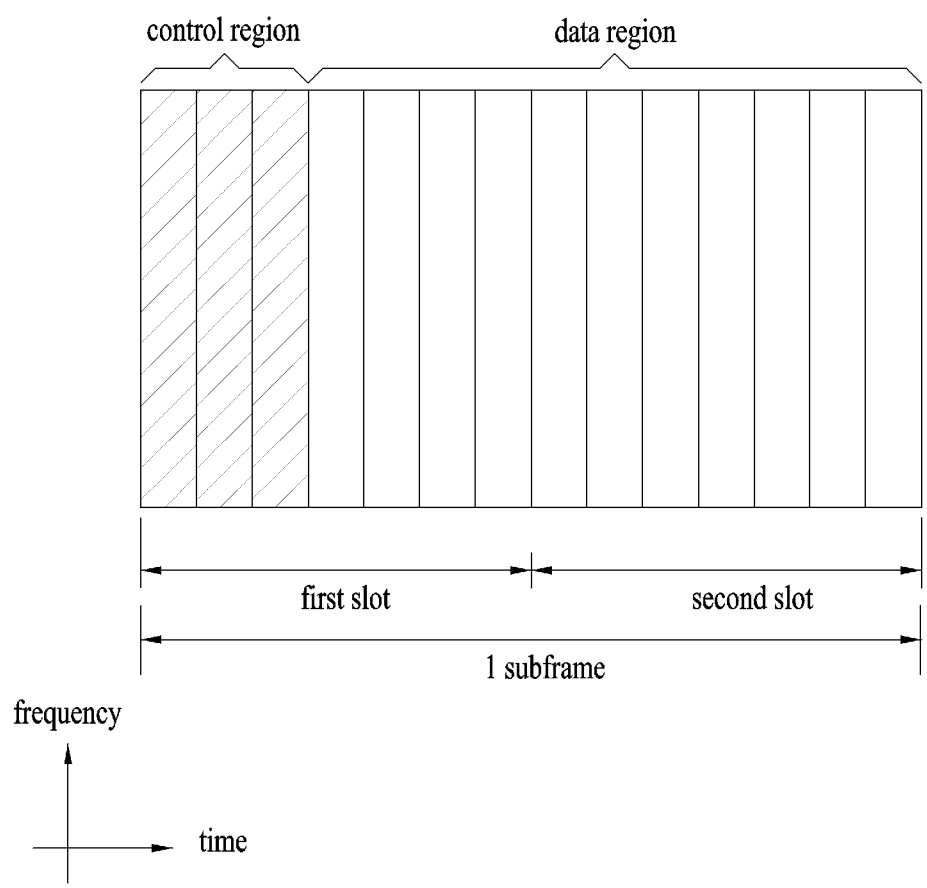
FIG. 6 illustrates a structure of a downlink subframe.

FIG. 6 illustrates the structure of a DL subframe.

Referring to FIG. 6, up to three or four OFDM symbols positioned at the front part of the first slot in a subframe correspond to a control region to which control channels are allocated. The other OFDM symbols in the subframe correspond to a data region to which a physical downlink shared channel (PDSCH) is allocated. Examples of the aquifer channels used in LTE include a physical control format indicator channel (PCFICH), a physical downlink control channel (PDCCH), and a physical hybrid ARQ indicator channel (PHICH). The PCFICH is transmitted in the first OFDM symbol of a subframe, carrying information about the number of OFDM symbols used for transmission of control channels in the subframe. The PHICH carries a HARQ acknowledgment (ACK)/negative-acknowledgment (NACK) signal in response to UL transmission HARQ ACK/NACK.

Control information carried on the PDCCH is called downlink control information (DCI). The DCI includes resource allocation information and other control information for a UE or a UE group. For example, the DCI includes DL/UL scheduling information, UL transmit (Tx) power control commands, etc.

The PDCCH carries information about resource allocation and a transmission format for a downlink shared channel (DL-SCH), information about resource allocation and a transmission format for an uplink shared channel (UL-SCH), paging information on a paging channel (PCH), system information on the DL-SCH, information about resource allocation for a higher-layer control message such as a random access response transmitted on the PDSCH, a Tx power control command set for individual UEs in a UE group, Tx power control commands, voice over Internet protocol (VoIP) activation indication information, etc. A plurality of PDCCHs may be transmitted in the control region. A UE may monitor a plurality of PDCCHs. A PDCCH is transmitted on an aggregation of one or more consecutive control channel elements (CCEs). A CCE is a logical allocation unit used to provide a PDCCH with a coding rate based on the state of a radio channel A CCE corresponds to a plurality of resource element groups (REGs). The format of a PDCCH and the number of PDCCH bits are determined according to the number of CCEs. An eNB determines a PDCCH format according to DCI transmitted to a UE and adds cyclic redundancy check (CRC) to control information. The CRC is masked with an identifier (ID) (e.g. a radio network temporary identifier (RNTI)) according to the owner or use of the PDCCH. For example, if the PDCCH is intended for a specific UE, the CRC may be masked with the ID (e.g., cell-RNTI (C-RNTI)) of the specific UE. If the PDCCH is intended for a paging message, the CRC thereof may be masked with a paging ID (e.g., paging-RNTI (P-RNTI)). If the PDCCH is intended for system information (particularly, a system information block (SIB)), the CRC thereof may be masked with a system information RNTI (SI-RNTI). If the PDCCH is intended for a random access response, the CRC thereof may be masked with a random access-RNTI (RA-RNTI).

Figure 7:
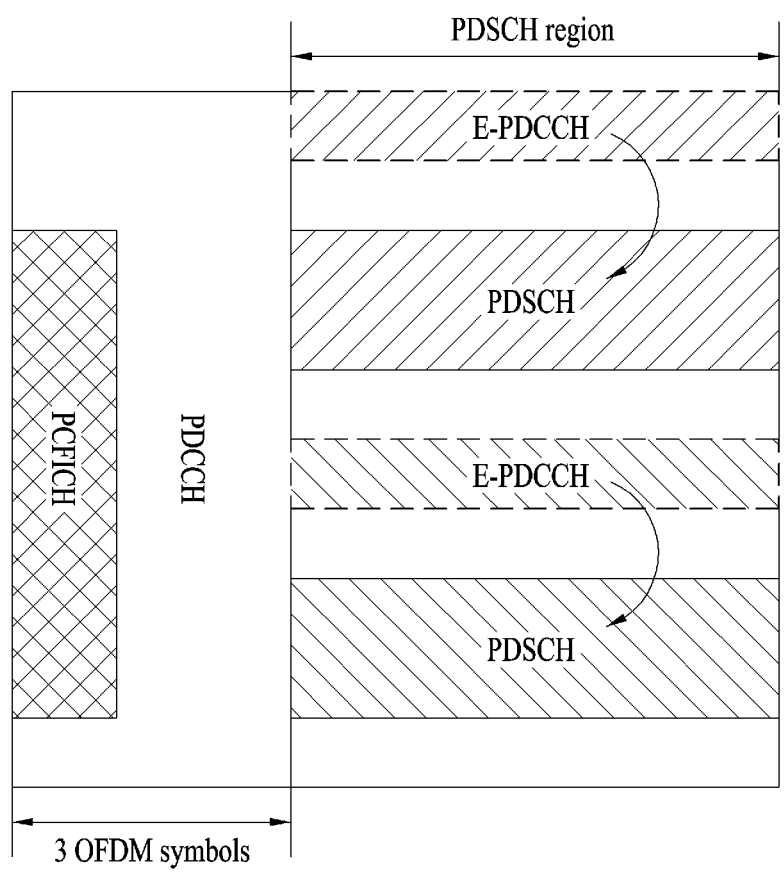
FIG. 7 illustrates EPDCCH and PDSCH scheduled by the EPDCCH.

FIG. 7 illustrates EPDCCH and PDSCH scheduled by the EPDCCH.

Referring to FIG. 7, in general, EPDCCH can be used by defining a portion of a PDSCH region for transmitting data and a user equipment should perform a blind decoding procedure for detecting whether EPDCCH of the user equipment is present. If the number of user equipment that access a node such as RRH while performing the same scheduling operation (i.e., PDSCH and PUSCH control) as legacy PDCCH, a large number of EPDCCHs are allocated to the PDSCH region, whereby the number of times of blind decoding to be performed by the user equipments is increased. Thus, the EPDCCH may have a disadvantage.

2. DRX Operation

Hereinafter, discontinuous reception (DRX) will be described.

To reduce battery consumption of a UE, the UE may be configured to perform a DRX operation and/or a DTX operation. A UE operating in DRX mode repeatedly turns on and off reception capabilities thereof and a UE operating in DTX mode repeatedly turns on and off transmission capabilities thereof. The present invention relates to the DRX operation and thus details of the DRX operation will be described below. First of all, in describing the embodiments of the present invention related to DRX, terms are defined as follows.

Active Time: This is a DRX related time during which a UE monitors PDCCH in a PDCCH-subframe.

mac-ContentionResolutionTimer: This is a parameter for specifying the number of consecutive subframe(s) in which a UE should monitor PDCCH after Msg3 transmission.

DRX Cycle: This is a parameter for specifying the periodic repetition of On Duration accompanied with a possible period of inactivity.

drx-InactivityTimer: This is a parameter for specifying the number of consecutive PDCCH-subframe(s) after successfully decoding PDCCH that indicates initial UL or DL user data transmission for a UE.

drx-RetransmissionTimer: This is a parameter for specifying the maximum number of PDCCH-subframe(s) in which DL retransmission is expected by a UE.

drxShortCycleTimer: This is a parameter for specifying the number of consecutive subframe(s) in which a UE should follow a short DRX cycle.

drxStartOffset: This is a parameter for specifying a subframe at which DRX cycle starts HARQ round trip time (RTT) Timer: This is a parameter for specifying the minimum number of subframes before DL HARQ retransmission expected by a UE.

Msg3: As a part of a random access procedure, this is a message transmitted on a UL-SCH (uplink shared channel) including a cell C-RNTI MAC (medium access control) CE (control element) or CCCH (common control channel) SDU (service data unit), which is provided by a higher layer and associated with a UE contention resolution identity.

onDurationTimer: This specifies the number of consecutive PDCCH-subframe(s) at the beginning of a DRX cycle.

PDCCH-subframe: This means a subframe with PDCCH or a subframe with R-PDCCH for a relay node (RN) having R-PDCCH, which is configured but not suspended. With regard to FDD UE behavior, the PDCCH-subframe may represent any random subframe. On the other hand, with regard to TDD UE behavior, the PDCCH-subframe may represent only a DL subframe and a subframe including DwPTS. In addition, with regard to RNs with an RN subframe configuration that is configured but not suspended, in communication between RN and E-UTRAN, the PDCCH-subframe may represent all DL subframes configured for RN communication with the E-UTRAN.

Once each of the above-mentioned timers starts, it is continuously running until it stops or expires. Otherwise, it is not running. The timer can be started if it is not running or restarted if it is running. The timer is always started or restarted from its initial value.

The DRX means to a scheme of enabling a UE to discontinuously receive a DL channel in order for the UE to reduce battery consumption. For example, if the DRX is configured, a UE attempts to receive PDCCH only in a determined time interval and does not attempt to receive the PDCCH in the rest of time intervals. In this case, the time interval in which a UE should attempt to receive PDCCH is referred to as On Duration and this On Duration is defined once in each DRX cycle.

A UE attempts to receive PDCCH at least during On Duration within one DRX cycle and the DRX cycle used in this case is divided into a long DRX cycle and a short DRX cycle according to a length. The long DRX cycle can minimize battery consumption of the UE and the short DRX cycle can minimize a data transmission delay.

IF the UE receives the PDCCH in the On Duration, additional transmission or retransmission may occur in a duration other than the On Duration. Accordingly, the UE needs to attempt PDCCH reception in a time interval in which the additional transmission or retransmission may occur even though the time interval is not the On Duration. In particular, the UE attempts to receive the PDCCH in a time interval in which onDurationTimer for managing On Duration, drx-InactivityTimer for managing inactivity, or drx-RetransmissionTimer for managing retransmission is running. In addition, even if the UE is performing a random access procedure or the UE attempts to receive a UL grant after sending a scheduling request, the UE attempts to receive PDCCH carrying the UL grant. Thus, a time interval in which the UE should attempt to receive the PDCCH is collectively referred to as Active Time. The Active Time includes On Duration in which a UE periodically attempts to receive PDCCH and a time interval during which a UE attempts to receive PDCCH when an event is triggered.

Figure 8:
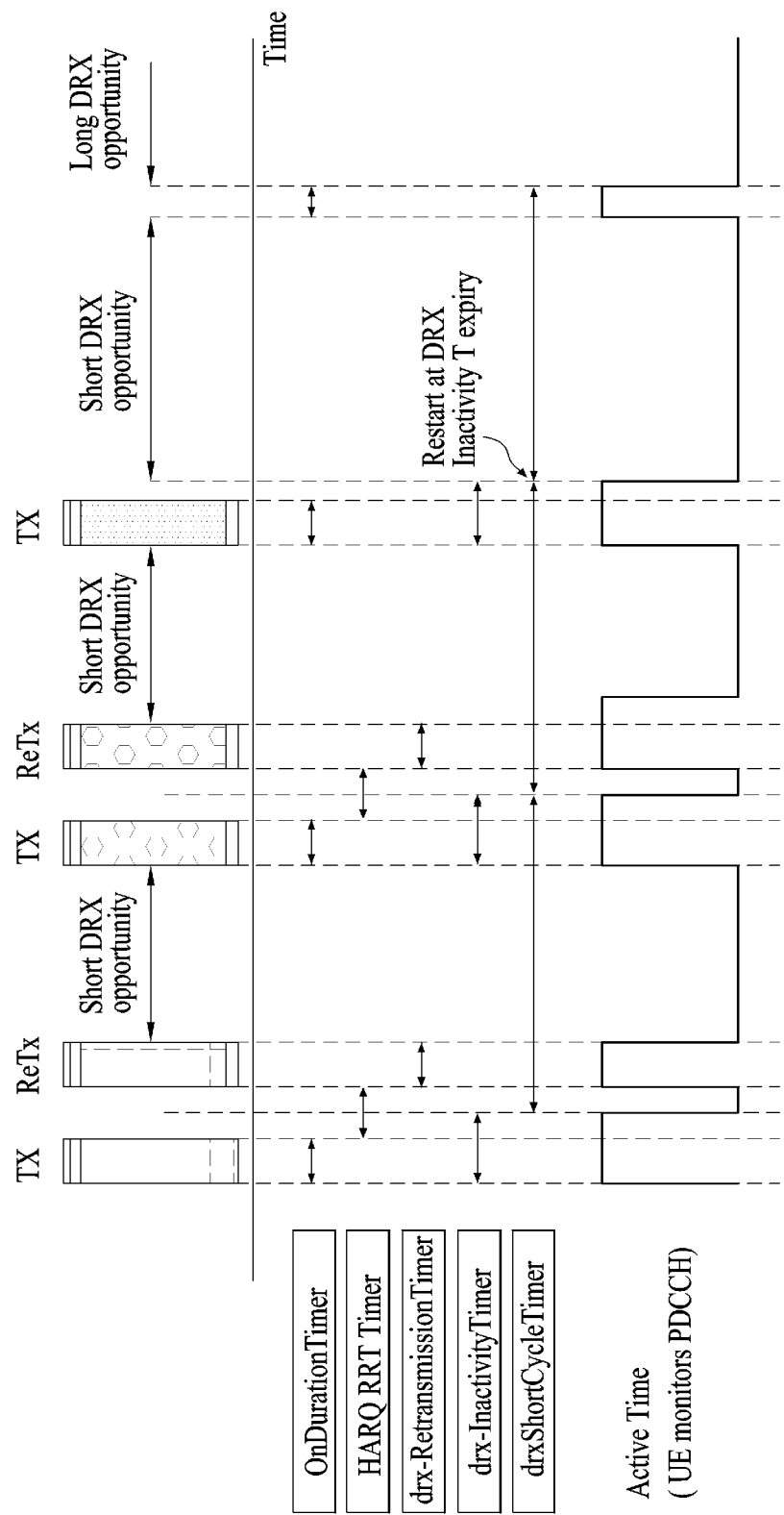
FIG. 8 illustrates a DRX (discontinuous reception) operation in a 3GPP LTE system.

FIG. 8 illustrates a DRX operation in a 3GPP LTE system.

A UE may be configured by RRC with DRX functionality that controls a PDCCH monitoring activity of the UE for C-RNTI (Cell Radio Network Temporary Identifier) corresponding to unique identification information used for identifying RRC connection and scheduling, TPC-PUCCH-RNTI (Transmit Power Control-Physical Uplink Control Channel-RNTI) corresponding to identification information used for power control of PUCCH, TPC-PUSCH-RNTI (Transmit Power Control-Physical Uplink Shared Channel-RNTI) corresponding to identification information used for power control of PUSCH, and (if configured) semi-persistent scheduling C-RNTI corresponding to unique identification information used for semi-static scheduling. In case of a RRC_CONNECTED state, if DRX is configured, the UE is allowed to monitor PDCCH discontinuously using a DRX operation. When using the DRX operation, the UE monitors the PDCCH according to requirements which will be described later. The RRC controls the DRX operation by configuring timers such as onDurationTimer, drx-InactivityTimer, drx-RetransmissionTimer, longDRX-Cycle, drx-StartOffset, drxShortCycleTimer, and shortDRX-Cycle. A HARQ RTT timer is also defined in each DL HARQ process. Only a value of the HARQ RTT timer is fixed to 8 ms and values of the other timers (e.g. onDurationTimer, drx-InactivityTimer, drx-RetransmissionTimer, or mac-ContentionResolutionTimer) are configured by an eNB through RRC signaling. The long DRX cycle and short DRX Cycle are also configured by the eNB through RRC signaling. Meanwhile, the eNB limits CQI/PMI/PTI/RI report of the UE to the On Duration of a DRX Cycle using cqi-Mask, which is a value configured by a higher layer (e.g. RRC layer). The eNB may command the UE to transition to a DRX state by transmitting a DRX command MAC CE (control element) to the UE. As will be described later, upon receiving the DRX command MAC CE from the eNB, the UE transitions to a short DRX state if a short DRX cycle is configured and, otherwise, the UE transitions to a long DRX state. The DRX command MAC CE is identified through a logical channel ID (LCID) of a MAC PDU subheader.

When a DRX cycle is configured, Active Time includes the following time intervals:
  time while onDurationTimer, drx-InactivityTimer, drx-RetransmissionTimer, or mac-ContentionResolutionTimer is running; or
  time while a scheduling request is sent on PUCCH and is pending; or
  time while a UL grant for pending HARQ retransmission can occur and there is data in a corresponding HARQ buffer; or
  time until receiving PDCCH, which indicates initial transmission of new data corresponding to C-RNTI of a UE after successful reception of a random access response with respect to a preamble not selected by the UE.

When DRX is configured, the UE should perform the following operations for each subframe.
  If a HARQ RTT timer expires in this subframe and data in a soft buffer of a corresponding HARQ process has not been successfully decoded:
    start drx-RetransmissionTimer for the corresponding HARQ process.
  If a DRX command MAC control element is received:
    stop onDurationTimer;
    stop drx-InactivityTimer.
  If drx-InactivityTimer expires or a DRX command MAC CE is received in this subframe:
    if Short DRX Cycle is configured:
      start or restart drxShortCycleTimer;
      start Short DRX Cycle.
    Else:
      use Long DRX Cycle.
  If drxShortCycleTimer expires in this subframe:
    use Long DRX Cycle.
  If Short DRX Cycle is used [(SFN*10)+subframe number] modulo (shortDRX-Cycle)=(drxStartOffset) modulo (shortDRX-Cycle); or
  If Long DRX Cycle is used [(SFN*10)+subframe number] modulo (longDRX-Cycle)=drxStartOffset:
    start onDurationTimer.
  During Active Time, for a PDCCH-subframe, if the subframe is not required for UL transmission in a half-duplex FDD UE and if the subframe is not a part of a configured measurement gap:
    monitor PDCCH.
    If the PDCCH indicates DL transmission or if DL assignment has been configured for this subframe:
      start HARQ RTT timer for the corresponding HARQ process;
      stop drx-RetransmissionTimer for the corresponding HARQ process.
    If the PDCCH indicates new (DL or UL) transmission:
      start or restart drx-InactivityTimer.
  When not in Active Time, type-0-triggered SRS should not be reported.

If CQI masking (cqi-Mask) is setup by a higher layer:
while on DurationTimer is not running, CQI/PMI/RI/PTI (channel quality indicator/precoding matrix indicator/rank indicator/precoding type indicator) should not be reported.
Else:
When not in Active Time, CQI/PMI/RI/PTI on the PUCCH should not be reported.

Regardless of whether a UE monitors PDCCH or not, if it is expected, the UE receives and transmits HARQ feedback and transmits type-1-triggered SRS.

NOTE: A UE may not report CQI/PMI/RI/PTI on PUCCH and/or type-0-triggered SRS transmission optionally in up to 4 subframes appearing after PDCCH that indicates new (UL or DL) transmission. However, the option of not reporting CQI/PMI/RI/PTI and/or type-0-triggered SRS transmission is not applicable to subframes in which onDurationTimer is running.

NOTE: The same Active Time is applied to resources operated in all activated serving carrier(s).

3. M2M Communication

In the following, M2M (Machine to Machine) communication is explained. An M2M communication may mean a communication form directly performed between devices (terminals) without human involvement. Terminals performing the M2M communication are referred to as an M2M UE. Meanwhile, an M2M communication scheme can be mainly classified into a scheme receiving a help from a network/coordination station (e.g., base station) and a scheme not receiving any help form the network/coordination station.

The devices performing communications by M2M scheme may be variously named M2M devices, M2M communication devices, MTC (machine type communication) devices and the like. And, the number of the devices performing communications by the M2M scheme will gradually increase as the number of machine application type increases in a prescribed network.

The machine application type may include (1) security, (2) public safety, (3) tracking and tracing, (4) payment, (5) healthcare, (6) remote maintenance and control, (7) metering, (8) consumer device, (9) POS (Point Of Sales) and fleet Management in a security related application market, (10) M2M communication of vending machine (11) smart meter for plant and machinery remote monitoring, operating time measurement on measurement on construction plant and machinery and auto-measurement of consumed heat or electricity quantity on construction plant and machinery, (12) surveillance video communication and the like, by which the machine application type may be non-limited. And, other machine application types can be applied.

According to other properties of an M2M device, the M2M device may have low mobility or no mobility when the M2M device is installed. It means that the corresponding M2M device is stationary for a considerably long time. An M2M communication system may be able to simplify or optimize mobility-related operations used for a specific M2M application related to such an M2M device having a stationary location as an M2M device for secured access and surveillance, an M2M device for public safety, an M2M device for payment, an M2M device for remote maintenance and control, an M2M device for metering and the like.

As mentioned earlier in the foregoing description, the number of M2M communication devices may rapidly increase compared to the number of general mobile communication devices as the number of the machine application type increases. Hence, in case that all of the M2M communication devices individually perform a communication with a base station, serious overhead can be given to a wireless interface and/or a network.

Meanwhile, as a form evolved from the aforementioned stationary M2M communication system, it may also consider a D2D communication directly performed between mobile terminals. The D2D communication can be understood as a communication system developed from H2H (Human to Human) communication and means a communication type performed between terminals without base station involvement.

Referring to FIG. 9, FIG. 9 (a) illustrates a scheme in which the network/coordination station intervenes in transmission and reception of control signal (e.g., grant message), HARQ, channel state information, etc. and user equipments that perform D2D communication transceive data only. On the other hand, FIG. 9 (b) illustrates a scheme in which the network provides minimum information (e.g., D2D connection information available in a corresponding cell) only but the user equipments that perform D2D communication establish links and also transceive data.

Hereinafter, for the convenience of the explanation, the present invention will be described based on the 3GPP LTE/LTE-A system. However, the scope of the system to which the present invention is applicable can be extended other systems besides the 3GPP LTE system. Moreover, the embodiments of the present invention can be extensively applied to not only a case that part of a time resource region and/or frequency resource region in the legacy system is assigned for the purpose of D2D communication but also a case that a new time resource region and/or frequency resource region (different from that in the legacy system) is (re)assigned.

Additionally, the embodiments of the present invention can be extensively applied to i) a case in which D2D user equipments that perform D2D communication are within coverage of a network (i.e., D2D Discovery/Communication Within Network Coverage), ii) a case in which D2D user equipments that perform D2D communication are out of coverage of a network (i.e., D2D Discovery/Communication Outside Network Coverage (for Public Safety Only)), or iii) a case in which among D2D user equipments that perform D2D communication, some of them are within coverage of a network and the reset of them are out of coverage of a network (D2D Discovery/Communication of Partial Network Coverage).

FIG. 10 illustrates examples of various environments or scenarios in which D2D communication (e.g., DISCOVERY PHASE and/or COMMUNICATION PHASE) is performed.

Referring to FIG. 10, D2D communication can be performed a case in which D2D user equipments that perform D2D communication are within coverage of a network (i.e., D2D Discovery/Communication Within Network Coverage) as shown in FIG. 10 (a), a case in which D2D user equipments that perform D2D communication are out of coverage of a network (i.e., D2D Discovery/Communication Outside Network Coverage (for Public Safety Only)) shown in FIG. 10 (b), or a case in which among D2D user equipments that perform D2D communication, some of them are within coverage of a network and the reset of them are out of coverage of a network (D2D Discovery/Communication of Partial Network Coverage) shown in FIG. 10 (c).

Moreover, a signal transmission/reception procedure and a signal information configuration required for a discovery step and/or communication step may be defined differently for individual environments or scenarios (i.e., FIG. 10 (a) to FIG. 10 (c)).

Hereinafter, for the convenience of the explanation of the present invention, a D2D discovery procedure and synchronization for D2D communication will be described First of all, the D2D discovery procedure is explained. The discovery procedure for D2D communication can be mainly divided into two types of discovery procedures. For example, the two types of the discovery procedures are explained as follows.

Type 1: A case that resources for discovery signal transmission are allocated non-UE specifically—the resources may be for all UEs/group of UEs.

Type 2: A case that resources for discovery signal transmission are allocated UE-specifically—in this case, a resource may be allocated for each discovery signal transmission (Type 2A) or resources may be semi-persistently allocated for discovery signal transmission (Type 2B).

However, the above-mentioned discovery procedures are currently under discussion and additional discussion on an entity, a method and the like for resource allocation is ongoing. Thus, the present invention should not be interpreted as limited to the aforementioned examples.

Secondly, synchronization for D2D communication (i.e., D2D discovery and communication) is explained in the following description. And, assume that there is at least one external synchronization reference and it exists at least within network (NW) coverage.

A UE initiates D2D signal transmission in an interval between T1 and T2. In this case, T1 corresponds to a timing of receiving synchronization reference. T2 corresponds to offset and may be one of positive/negative/zero.

Option 1: The synchronization reference may be derived from a timing of a cell. In the Option 1, a case that each cell has different time is not included and a cell used in timing derivation may be UE's serving cell or not. Moreover, T2 may be fixed (option 1.1), be configured by a network (option 1.2), or be derived from a PUSCH transmission timing of a related cell (option 1.3) (The option 1.3 can be applied to only a case that a UE knows the PUSCH timing).

Option 2: The synchronization reference may be a synchronization signal transmitted from one UE. In the option 2, T2 may be fixed (option 2.1) or be obtained through the one UE (option 2.2).

Option 3: The synchronization reference may include synchronization signals transmitted from a plurality of UEs. In the option 3, T2 may be fixed (option 3.1) or be obtained through a plurality of the UEs (option 3.2).

Option 4: The synchronization reference may be transmitted from an external source (e.g., GNSS).

However, the above-mentioned options are provided to help the understanding of the present invention and the present invention should not be interpreted as excluding other options except the aforementioned options.

In addition, the options 1 and 4 are under discussion for a D2D discovery signal within network coverage and the options 2, 3 and 4 are under discussion for a D2D discovery signal out of network coverage. Further, for a D2D communication signal, the above-mentioned options 1, 2, 3 and 4 are considered but the option 1.3 is supported at least in case that it is within network coverage.

4. Operation Method of UE Proposed by the Present Invention

In the following, a method for an M2M UE to efficiently operating in a situation in which M2M communication proposed by the present invention is performed is explained based on the aforementioned contents. Unless there is a special citation, such a term as 'UE' is comprehended as an M2M UE.

First of all, characteristics of the M2M communication are explained. Since an amount of data transmitted/received by an M2M UE is relatively smaller than an amount of data transmitted/received by a general UE, time taken for transmitting/receiving data by the M2M UE is very short. And, the M2M communication is performed with a relatively constant period according to the usage and an application type of the M2M communication. In this case, the period may become several hours to several days. Due to the characteristic, the M2M communication performed by the M2M UE has characteristic that network traffic is predictable. In other word, the M2M UE is able to know an amount of UL data to be transmitted by the M2M UE and information on whether or not there exists UL data to be additionally transmitted by the M2M UE. The M2M UE can inform a base station communicating with the M2M UE of frequency and the amount of UL data transmission in advance.

As mentioned in the foregoing description, data amount required for the M2M communication is relatively less as much as several bytes to several kilobytes. In order to perform UL data transmission despite of the small amount of data transmission, it is necessary to establish RRC connection between the M2M UE and the base station in every transmission and the M2M UE should switch to an idle mode after data is transmitted. Hence, it is necessary for the M2M UE to repeatedly perform a process of establishing and cancelling RRC connection in every data transmission. Among power consumed by the M2M UE, overhead of a part related to the RRC connection/release is not small.

In the following, an operation method of the M2M UE is proposed in consideration of the aforementioned characteristics of the M2M communication with reference to FIGS. 11 to 14. In describing FIGS. 11 to 14, as mentioned in the foregoing description, assume that the M2M UE is aware of the amount of UL data to be transmitted by the M2M UE. Hence, the M2M UE is able to know timing at which UL data transmission is finished. In particular, it may consider a case that the M2M UE is aware of timing at which data connection with the base station is no longer necessary. Meanwhile, since the base station communicating with the M2M UE goes through a process of discussing on performance and characteristic of the M2M UE in the course of establishing a connection with the M2M UE, the base station is also able to know the aforementioned characteristics of the M2M UE. Or, the base station is able to know the characteristic of the M2M UE by receiving information on the characteristic of the M2M UE from an MME (Mobility Management Entity).

FIGS. 11 to 14 are flowcharts for a proposed operation method of a UE. In the following, each of embodiments shown in FIGS. 11 to 14 is explained.

First of all, a UE (M2M UE) performs M2M communication while transmitting and receiving data with a base station [S1110]. Subsequently, the UE checks there is no additional data transmission [S1120]. As mentioned in the foregoing description, this is because, since the M2M communication is periodically performed and a data amount of the M2M communication is fixed, the UE and the base station are able to predict network traffic of the M2M communication.

If it is checked that there is no additional M2M communication, the base station transmits an RRC connection release message to the UE [S1130]. In this case, it is necessary to note that there is no separate process requested to the base station by the UE to enter an idle mode. In particular, since the UE is able to predict data transmission of the UE and the base station is able to know information on the data transmission of the UE, the base station can preferentially transmit the RRC connection release message to the UE. Meanwhile, having received the RRC connection release message, the UE switches to an idle mode [S1140]. Although it is not explicitly shown in the drawing, the UE may transmit a response message to the base station in response to the RRC connection release message before switching to the idle mode.

Meanwhile, unlike the embodiment shown in the drawing, an order of the step S1130 and the step S1140 can be changed. In other word, if it is checked that there is no additional data transmission, the UE can autonomously switch to the idle mode. If there is no additional data transmission, it means that there is no prearranged UL transmission from the UE and there is no scheduling from the base station. Hence, the UE can preferentially switch to the idle mode despite the UE does not receive separate signaling from the base station. In the present embodiment, if the UE switches to the idle mode, the base station is able to check that the UE is in an inactive state for a prescribed time (there is no data communication with the UE). Although there is no separate request from the UE, the base station is able to cancel the RRC connection established with the UE.

Figure 11:
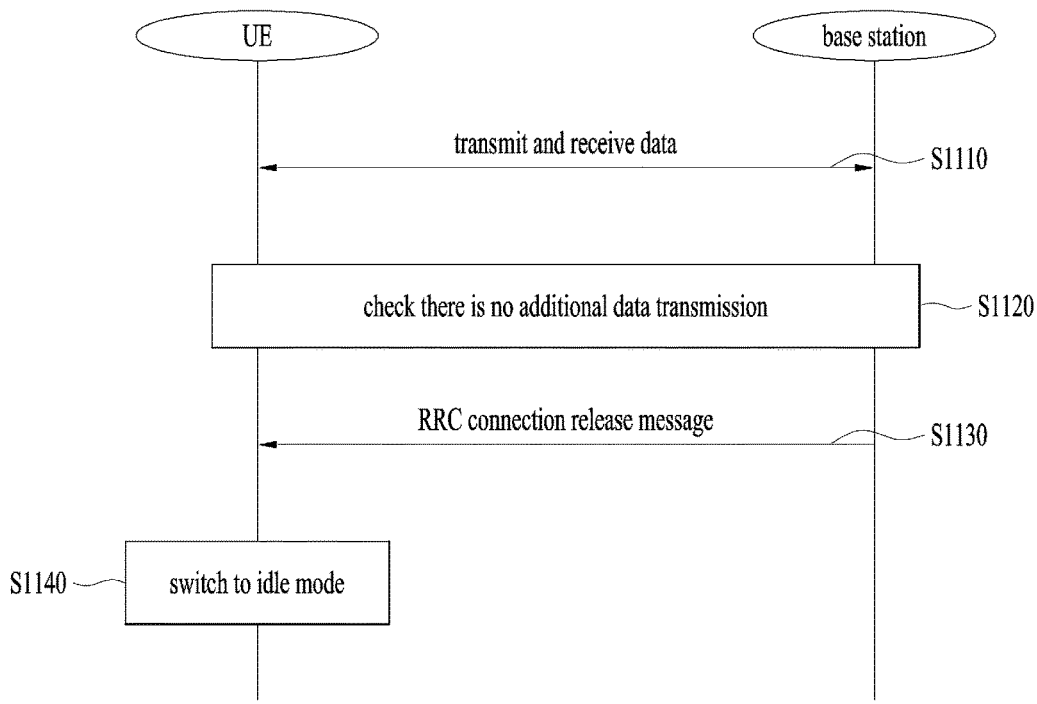
FIGS. 11 to 14 are flowcharts for a proposed operation method of a UE.
Figure 12:
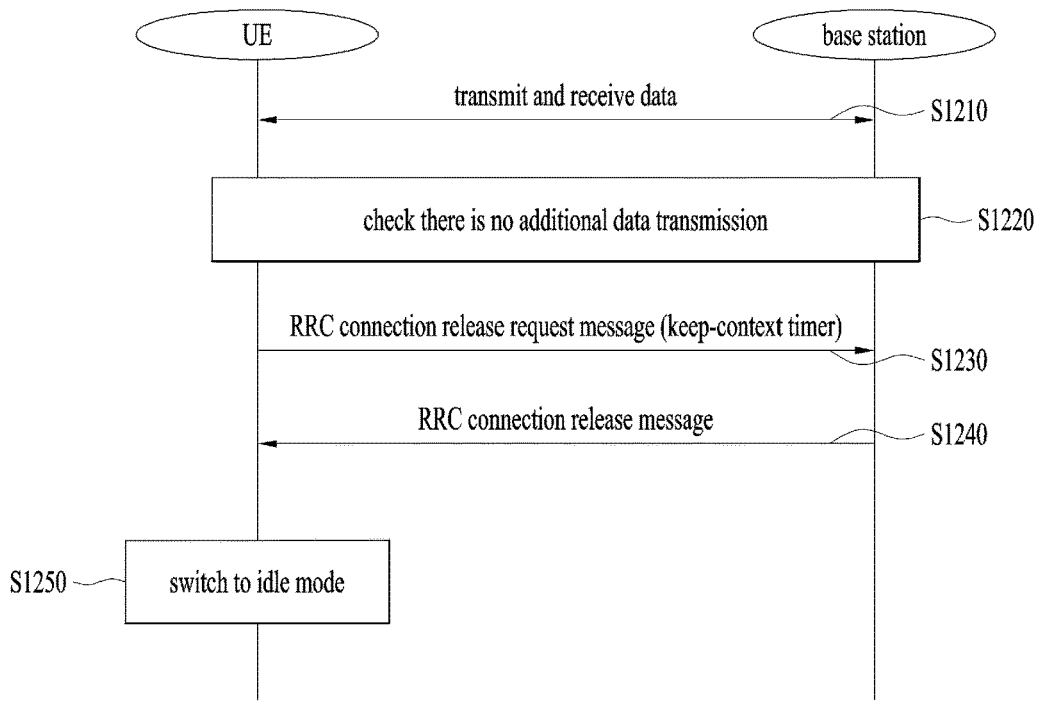

In embodiment shown in FIG. 12, similar to FIG. 11, the UE and the base station perform M2M communication [S1210]. Subsequently, the UE and/or the base station checks there is no data to be transmitted/received [S1220].

Meanwhile, in the embodiment of FIG. 12, if the UE checks that there is no additional data transmission/reception, the UE transmits an RRC connection release request message to the base station [S1230]. In the present embodiment, RRC connection request message corresponds not only to a message for confirming that there is no additional data transmission but also to a message for asking the base station to maintain context information of the UE for a prescribed time.

In general, if RRC connection is cancelled and the UE switches to the idle mode, the base station deletes the context information of the UE without maintaining the context information any more. The context information includes not only context information set to the UE by the base station but also context information received from an MME (e.g., performance of the UE, information on a policy set to the UE, etc.). If the RRC connection is cancelled, the base station also discards a security parameter set to the UE. Hence, when an RRC connection is reestablished between the base station and the UE, it is necessary for the base station to receive information on the UE again from the MME.

Yet, as mentioned in the foregoing description, an amount and frequency of data transmission of an M2M UE is relatively less compared to a general UE. Hence, if the base station deletes context information of M2M UE whenever the base station performs M2M communication with the M2M UE and receives information on a next M2M UE again, it may cause unnecessary signaling overhead.

Hence, according to an embodiment proposed by the present invention, a UE transmits an RRC connection request message to a base station in a manner of including a prescribed timer in the RRC connection request message. The timer may correspond to a 'keep-context timer'. In particular, the timer corresponds to a timer for asking the base station to maintain context information of the UE during a time period corresponding to the timer without deleting the context information. The UE asks the base station to maintain the context information to reduce signal overhead taken for next M2M communication. The UE can configure a value of the context keeping timer in consideration of timing at which next data transmission is to be performed. For example, the value of the timer can be configured to indicate a time period longer than a period between timing at which the RRC connection release request message is transmitted in the step S1230 and timing at which next data transmission is expected.

Meanwhile, the context information, which is requested to be maintained by the base station during the time period indicated by the timer, can include various informations on the UE. For example, the context information can include at least one selected from the group consisting of information on a C-RNTI (Cell-Radio Network Temporary Identifier) of the UE, a parameter for E-RAB (E-UTRAN Radio Access Bearer) of the UE, information on a QCI (QoS Class Identifier), information on ARP (Allocation and Retention Priority), information on UE-AMBR (User Equipment-Aggregated Maximum Bit Rate), and information on S1 S-GW TEID (S1 Serving GateWay Tunnel Endpoint Identifier).

Having received the RRC connection release request message including the timer for requesting the context information to be maintained for a prescribed time period, the base station transmits an RRC connection release message in response to the RRC connection release request message [S1240]. In the present embodiment, if the UE asks the base station to maintain the context information, the base station determines whether or not the base station is able to maintain the context information during the time period of the timer transmitted by the UE. If it is determined as the base station is able to maintain the context information during the requested time period, the base station transmits information indicating the maintenance of the context information to the UE in a manner of including the information in the RRC connection release message.

On the contrary, if it is determined as the base station is unable to maintain the context information during the requested time period due to network load, and the like, the base station can transmit a new timer to the UE in a manner of including the new timer in the RRC connection release message. The new timer, which is transmitted to the UE in a manner of being included in the RRC connection release message, can indicate a maximum time period capable of maintaining the context information of the UE. In particular, the base station can determine a time period capable of maintaining the context information of the UE irrespective of the time period requested by the UE and informs the UE of the determined time period. As a different method, if it is determined as the base station is unable to maintain the context information during the requested time period, the base station can transmit information indicating that the base station is unable to maintain the context information to the UE in a manner of including the information in the RRC connection release message without configuring a new timer.

Having received the RRC connection release message, the UE switches to an idle mode [S1250]. If the UE enters the idle mode, the base station cancels the RRC connection established with the UE. If it is determined to maintain the context information in the steps S1230 and S1240, the base station maintains the context information of the UE during a prescribed time period without deleting the context information of the UE. The UE also maintains information on a connection with the base station during the same time period without deleting the information. The time period during which the context information is maintained may correspond to a time period requested by the UE or a time period configured by the base station in response to a request of the UE.

Meanwhile, if additional M2M communication is performed between the UE and the base station during a time period corresponding to a context keeping timer, the UE transmits an SR (Scheduling Request) to the base station using C-RNTI included in the context information instead of newly establishing an RRC connection with the base station. In particular, it may be able to perform random access between the UE and the base station to reduce overhead for establishing the new RRC connection and power consumption.

According to a further different embodiment, if new M2M communication is performed during a time period corresponding to a context keeping timer, the UE and the base station can perform a procedure of reestablishing RRC connection. The RRC connection reestablishment procedure is simpler than a procedure of establishing new RRC connection. However, since a procedure of discussing on performance of the UE or configuring a security parameter is accompanied with the RRC connection reestablishment procedure, additional signaling is required compared to an embodiment of transmitting an SR.

Meanwhile, if new M2M communication is not performed after the context keeping timer is expired, both the UE and the base station discard context information maintained in the UE and the base station. And, if a serving cell of the UE is changed, both the UE and the base station may discard the context information.

Figure 13:
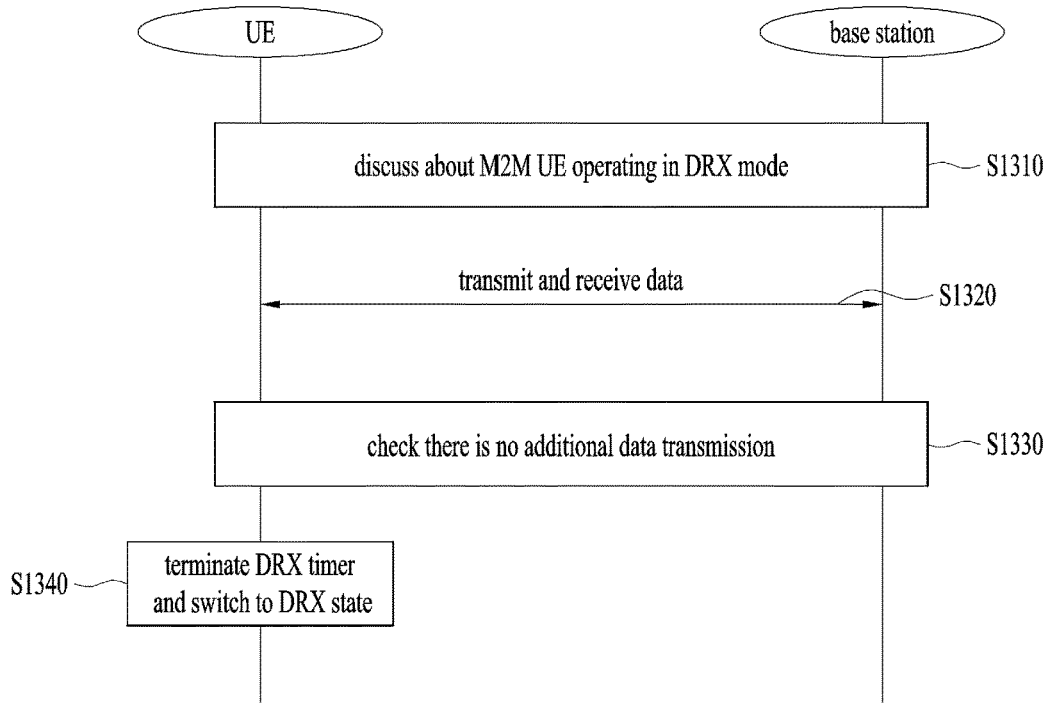
Figure 14:
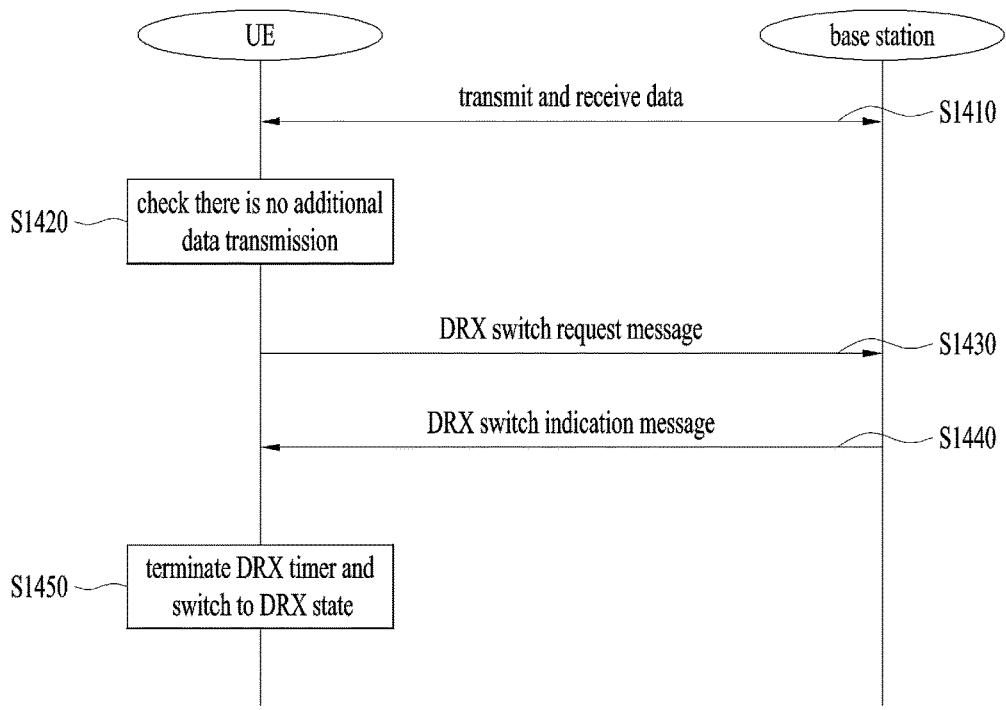

Embodiments different from the embodiments mentioned earlier in FIGS. 11 and 12 are explained in FIGS. 13 and 14. First of all, referring to FIG. 13, a UE and a base station discuss that the UE corresponds to an M2M UE operating in a DRX mode in the course of initially establishing a connection [S1310]. When information on the M2M UE and performance of the M2M UE are discussed, the base station obtains information on an amount of data transmitted by the M2M UE and transmission frequency and may be able to check that data are periodically transmitted by the M2M UE.

Since the M2M UE is aware of the amount of data transmitted by the M2M UE and the period of data transmission, if it is determined as there is no additional data transmission, the M2M UE may notify the base station that the M2M UE is going to switch to a DRX state without a separate request. Through the discussion performed in the step S1310, if M2M communication with the M2M UE is terminated, the base station is able to know that the M2M UE is going to autonomously operate in a DRX mode although separate signaling is not transmitted to the M2M UE.

Meanwhile, the M2M communication is performed between the UE and the base station in the step S1320. Subsequently, the UE and the base station check that there is no additional data transmission [S1330]. The UE immediately switches to the DRX state and operates in the DRX mode without waiting for additional signaling from the base station according to what is discussed with the base station in advance [S1340]. In the step S1340, the UE terminates a DRX timer (e.g., drx-inactivate timer and/or on-duration timer), switches to the DRX state, and attempts to receive PDCCH in a time period which is determined according to the DRX mode only.

Meanwhile, in the present embodiment, the DRX timer can be defined in a manner of being different from a legacy timer. In other word, it may be able to define 'M2M-specific DRX timer'. The M2M-specific DRX timer is defined to reflect a characteristic that M2M communication is performed with a relatively long interval. For example, such a parameter as a DRX cycle, a drx-inactive timer, an on-duration timer, etc. can be configured in a unit of several minutes or several hours rather than a legacy unit of subframes.

The UE can inform the base station that there is no additional data transmission. This procedure is explained in detail in the embodiment of FIG. 14. So far, the embodiment that the amount of data transmitted by the M2M UE and the data transmission period are discussed between the UE and the base station has been explained. On the other hand, the present embodiment explains a case that the base station is unaware of timing at which UL transmission of the UE ends, i.e., a case that the base station is unaware of information on whether or not there is additional data transmission.

Referring to FIG. 14, the UE and the base station perform M2M communication [S1410]. Subsequently, the UE checks that there is no additional UL data transmission to the base station [S1420]. Unlike the aforementioned embodiments, in FIG. 14, the base station is unaware of information on data transmission of the UE and only the UE is aware of information on whether or not UL data is transmitted.

If the UE checks that there is no UL data transmission, the UE transits a DRX switching request message to the base station [S1430]. The DRX switching request message corresponds to a message for informing the base station that there is no additional data transmission. The DRX switching request message can be performed in a form of a BSR (Buffer Status Report). A BSR message defined in LTE/LTE-A consists of 8 bits including 2 bits for indicating a LCG ID (Logical Channel Group) ID and 6 bits for reporting a buffer status. The 2 bits for indicating an LCG ID are used to identify 4 different LCGs and each of the LCGs includes data/bearers having a common QoS requirement.

Meanwhile, since service requirements of M2M UEs have a common characteristic, it can be considered as the M2M UEs belong to a single LCG. In other word, although 1 bit is used to indicate an LCG ID of a UE among a BSR message of an M2M UE, it is able to sufficiently indicate the LCG ID. Hence, among the legacy 2 bits, the remaining 1 bit can be used for a different purpose according to a proposed embodiment.

According to one embodiment, the UE may use the remaining 1 bit of the BSR message for 'DRX switching request message'. In particular, if the remaining 1 bit of the BSR message indicates '0', it may indicate that there is no UL data to be additionally transmitted after the BSR message is transmitted. On the contrary, if the remaining 1 bit of the BSR message indicates '1', it may indicate that the UE may additionally perform UL data transmission after the BSR message is transmitted. According to the present embodiment, if the UE transmits the BSR message of which the remaining bit is set to '0' to the base station, it can be comprehended as a procedure of transmitting the aforementioned 'DRX switching request message' to the base station. Having received the BSR message of which the remaining bit is set to '0', the base station is able to check that there is no additional data transmission from the UE.

According to a different embodiment, among 6 bits for reporting a buffer status, 1 bit (e.g., last bit) may indicate whether or not there is additional UL transmission of the UE instead of 2 bits for indicating an LCG ID. In particular, since the M2M UE has characteristics that a data transmission interval is relatively long and an amount of data is small, it may consider a case that it is not necessary to use all 6 bits for indicating a buffer status. In this case, the last bit among 6 bits for indicating a buffer status can be utilized as the aforementioned 'remaining 1 bit'.

Having received a BSR message of which the remaining 1 bit is set to '0' (i.e., DRX switching request message) from the UE, the base station transmits a DRX switching indication message to the UE to make the UE operate in a DRX mode [S1440]. Having received the DRX switching indication message, although a drx-inactivity timer is not expired, the UE terminates the timer and switches to DRX state [S1450]. In particular, the UE switches to the DRX state earlier than a time period defined in the DRX timer to more reduce power consumption of the UE.

The embodiment mentioned earlier in FIG. 14 can be similarly applied to an eDDA (enhancements for Diverse Data Applications) system introduced in 3GPP LTE/LTE-A Release 11 to enhance power consumption of a UE. In particular, it may consider a following case. A measurement report message transmitted from a moving terminal indicates that handover is required and there is no data to be additionally transmitted from the terminal. In this case, a base station indicates the UE to switch to a DRX state before the UE performs the handover. Hence, the UE can save power consumed for performing the handover in the aspect of battery performance Besides the aforementioned embodiment, if UEs do not have additional data transmission, the base station may preferentially schedule the UEs to indicate the UEs to switch to the DRX state. By doing so, it may be able to improve battery performance of a plurality of UEs. Since the base station is aware of the characteristic of M2M UE in advance, the aforementioned embodiments are common in that power consumption of a UE is enhanced by a simple scheme of indicating that there is no additional data transmission using a remaining bit.

In FIGS. 11 to 14, an operation method of an M2M UE has been explained. If the M2M UE is positioned at a stationary position, all of the embodiments mentioned earlier in FIGS. 11 to 14 can be applied to the M2M UE. Meanwhile, in case of an M2M UE having mobility (e.g., a UE used for a vehicle tracking system or a pay as you drive system), the embodiments mentioned earlier in FIGS. 11 and 12 can be more efficiently applied to the M2M UE compared to the embodiments mentioned earlier in FIGS. 13 and 14.

5. Apparatus Configuration

Figure 15:
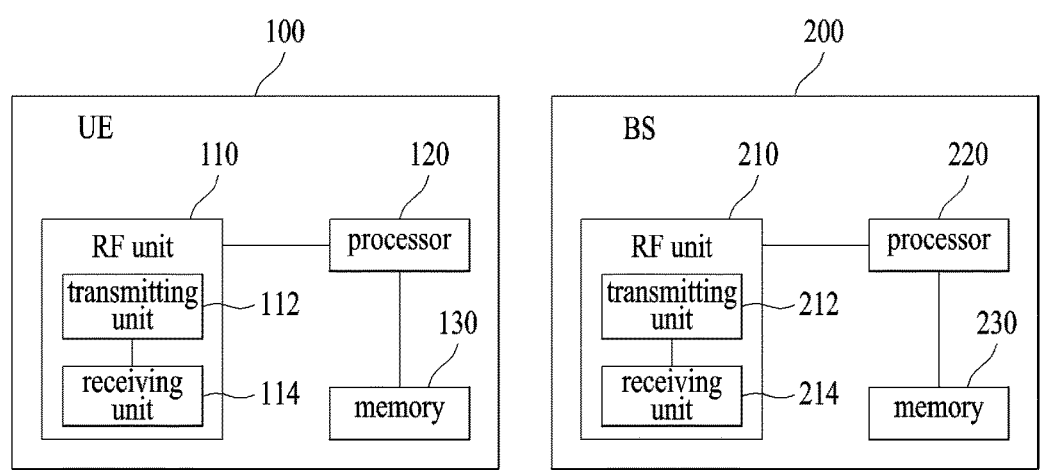
FIG. 15 is a diagram for configurations of a user equipment and a base station according to one embodiment of the present invention.

FIG. 15 is a block diagram showing the configuration of a user equipment and a base station according to one embodiment of the present invention. In FIG. 15, the user equipment 100 and the base station 200 may include radio frequency (RF) units 110 and 210, processors 120 and 220 and memories 130 and 230, respectively. Although a 1:1 communication environment between the user equipment 100 and the base station 200 is shown in FIG. 15, a communication environment may be established between a plurality of user equipment and the base station. In addition, the base station 200 shown in FIG. 15 is applicable to a macro cell base station and a small cell base station.

The RF units 110 and 210 may include transmitters 112 and 212 and receivers 114 and 214, respectively. The transmitter 112 and the receiver 114 of the user equipment 100 are configured to transmit and receive signals to and from the base station 200 and other reception modules and the processor 120 is functionally connected to the transmitter 112 and the receiver 114 to control a process of, at the transmitter 112 and the receiver 114, transmitting and receiving signals to and from other apparatuses. The processor 120 processes a signal to be transmitted, sends the processed signal to the transmitter 112 and processes a signal received by the receiver 114.

If necessary, the processor 120 may store information included in an exchanged message in the memory 130. By this structure, the user equipment 100 may perform the methods of the various embodiments of the present invention.

The transmitter 212 and the receiver 214 of the base station 200 are configured to transmit and receive signals to and from another base station and user equipments and the processor 220 are functionally connected to the transmitter 212 and the receiver 214 to control a process of, at the transmitter 212 and the receiver 214, transmitting and receiving signals to and from other apparatuses. The processor 220 processes a signal to be transmitted, sends the processed signal to the transmitter 212 and processes a signal received by the receiver 214. If necessary, the processor 220 may store information included in an exchanged message in the memory 230. By this structure, the base station 200 may perform the methods of the various embodiments of the present invention.

The processors 120 and 220 of the user equipment 100 and the base station 200 instruct (for example, control, adjust, or manage) the operations of the user equipment 100 and the base station 200, respectively. The processors 120 and 220 may be connected to the memories 130 and 230 for storing program code and data, respectively. The memories 130 and 230 are respectively connected to the processors 120 and 220 so as to store operating systems, applications and general files.

The processors 120 and 220 of the present invention may be called controllers, microcontrollers, microprocessors, microcomputers, etc. The processors 120 and 220 may be implemented by hardware, firmware, software, or a combination thereof.

If the embodiments of the present invention are implemented by hardware, Application Specific Integrated Circuits (ASICs), Digital Signal Processors (DSPs), Digital Signal Processing Devices (DSPDs), Programmable Logic Devices (PLDs), Field Programmable Gate Arrays (FPGAs), etc. may be included in the processors 120 and 220.

Meanwhile, the aforementioned method can be written as computer programs and can be implemented in general-use digital computers that execute the programs using a computer readable recording medium. And, a data structure used for the aforementioned method can be recorded by various means in a computer-readable media. Program storing devices usable for explaining a storing device, which includes an executable computer code configured to perform various methods of the present invention, should not be understood as a device including such temporary objects as carrier waves and signals. The computer-readable media includes such a storing media as a magnetic storing media (e.g., a ROM, a floppy disk, a hard disk and the like) and an optical reading media (e.g., a CD-ROM, a DVD and the like).

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

INDUSTRIAL APPLICABILITY

Although the method of receiving a synchronization signal is described centering on examples applied to 3GPP LTE and LTE-A, it may be applicable to various wireless communication systems including IEEE 802.16x and 802.11x system as well as to the LTE/LTE-A system. Moreover, the proposed method can also be applied to mmWave communication system using a microwave frequency band.

What is claimed is:

1. An operation method of a user equipment (UE) with a base station in a wireless communication system, the method comprising:
transmitting a first message to the base station to request maintaining context information during a radio resource control (RRC) mode transition of the UE from an RRC connected mode to an RRC idle mode, when there is no data to be additionally transmitted during uplink transmission; and
receiving a second message from the base station in response to the first message,
wherein the second message relates to the RRC mode transition of the UE to the RRC idle mode,
wherein the first message comprises a context keeping timer related to a prescribed time period that the context information is to be maintained, and
wherein the context keeping timer is configured by the UE.

2. The method of claim 1, wherein a value of the context keeping timer is determined based on a time period between a first timing that the first message is transmitted and a second timing that a new uplink transmission is to be performed.

3. The method of claim 2, wherein when the base station is able to maintain the context information, the second message comprises information on a time period capable of maintaining the context information maintained by the base station.

4. The method of claim 1, wherein when the base station is unable to maintain the context information, the second message comprises information informing that the base station is unable to maintain the context information.

5. The method of claim 1, further comprising:
according to the received second message, switching the RRC mode of the UE to the RRC idle mode while maintaining context information occupied by the UE.

6. The method of claim 5, further comprising:
when a new uplink transmission is performed for the prescribed time period, transmitting a scheduling request (SR) to the base station.

7. The method of claim 5, further comprising:
when a new uplink transmission is performed for the prescribed time period, performing an RRC connection reestablishment procedure with the base station.

8. The method of claim 1, wherein the context information comprises at least one selected from the group consisting of information on a Cell-Radio Network Temporary Identifier (C-RNTI) of the UE, a parameter for E-UTRAN Radio Access Bearer (E-RAB) of the UE, information on a QoS Class Identifier (QCI), information on Allocation and Retention Priority (ARP), information on User Equipment-Aggregated Maximum Bit Rate (UE-AMBR), and information on S1 Serving GateWay Tunnel Endpoint Identifier (S1 S-GW TEID).

9. The method of claim 1, wherein when the prescribed time period is expired, the context information is discarded by the UE.

10. A user equipment (UE) operating with a base station in a wireless communication system, the UE comprising:
a transmitter;
a receiver; and
a processor, operatively coupled to the transmitter and the receiver,
wherein the processor is configured to:
transmitter to transmit a first message to the base station to request maintaining context information during a radio resource control (RRC) mode transition of the UE from an RRC connected mode to an RRC idle mode, when there is no data to be additionally transmitted during uplink transmission,
control the receiver to receive a second message from the base station in response to the first message,
wherein the second message relates to the RRC mode transition of the UE to the RRC idle mode,
wherein the first message comprises a context keeping timer related to a prescribed time period that the context information is to be maintained, and
wherein the context keeping timer is configured by the UE.

11. An operation method of a base station with a user equipment (UE), the method comprising:
receiving a first message for requesting that context information be maintained from the UE during a radio resource control (RRC) mode transition of the UE from an RRC connected mode to an RRC idle mode, when there is no data to be additionally transmitted during uplink transmission; and
transmitting a second message to the UE in response to the first message,
wherein the second message relates to the RRC mode transition of the UE to the RRC idle mode,
wherein the first message comprises a context keeping timer related to a prescribed time period that the context information is to be maintained, and
wherein the context keeping timer is configured by the UE.

12. A base station operating with a user equipment (UE), the base station comprising:
a transmitter;
a receiver; and
a processor, operatively coupled to the transmitter and the receiver,
wherein the processor is configured to:
control the receiver to receive a first message for requesting that context information be maintained from the UE during a radio resource control (RRC) mode transition of the UE from an RRC connected mode to an RRC idle mode, when there is no data to be additionally transmitted during uplink data transmission,
control the transmitter to transmit a second message to the UE in response to the first message,
wherein the second message relates to the RRC mode transition of the UE to the RRC idle mode,
wherein the first message comprises a context keeping timer related to a prescribed time period that the context information is to be maintained, and
wherein the context keeping timer is configured by the UE.

* * * * *